(12) United States Patent
Brocke et al.

(10) Patent No.: US 8,179,793 B2
(45) Date of Patent: May 15, 2012

(54) METHOD FOR MANAGING DATA TRANSMISSION ACCORDING TO A QUALITY OF SERVICE IN A NETWORK ASSEMBLY AND A COMPUTER NETWORK SYSTEM

(75) Inventors: Jens Brocke, Laatzen (DE); Andreas Matthias Aust, Hannover (DE); Frank Glaeser, Hannover (DE); Ralf Koehler, Hannover (DE); Stefan Kubsch, Hohnhorst (DE); Eduard Siemens, Sehnde (DE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/459,369

(22) Filed: Jun. 30, 2009

(65) Prior Publication Data

US 2010/0014540 A1 Jan. 21, 2010

(30) Foreign Application Priority Data

Jul. 15, 2008 (EP) ..................................... 08160378

(51) Int. Cl.
*H04L 12/26* (2006.01)
*H04L 12/56* (2006.01)
(52) U.S. Cl. .......................... 370/230; 370/235; 370/401
(58) Field of Classification Search .......................... None
See application file for complete search history.

(56) References Cited

U.S. PATENT DOCUMENTS

2007/0189293 A1* 8/2007 Yamada et al. ............... 370/392
2007/0230363 A1* 10/2007 Buskens et al. ............... 370/252
2008/0107127 A1* 5/2008 Engel et al. .................... 370/443
2009/0052423 A1* 2/2009 Aghvami et al. ............. 370/338

FOREIGN PATENT DOCUMENTS

| EP | 1718006 | 11/2006 |
|---|---|---|
| WO | WO2004/102896 | 11/2004 |
| WO | WO2008/070957 | 6/2008 |

OTHER PUBLICATIONS

Resource and admission control functions in Next Generation Networks; Y. 2111 (Sep. 2006)' ITU-T Draft Study Period 2005-2008, International Telecommunication Union, Geneva : CH, No. Y. 2111 (Sep. 2006). Sep. 13, 2006, pp. I, II, I-80, XP017405154.
ITU WG3: "Revision 1 of TR-RACS, FGNGN-OD-00074" ITU-T Internal Document, International Telecommunication Union, Geneva, CH, Dec. 3, 2004, pp. 1-22 XP002424686.
Search report dated Oct. 9, 2009.

* cited by examiner

*Primary Examiner* — Chi Pham
*Assistant Examiner* — Soon-Dong Hyun
(74) *Attorney, Agent, or Firm* — Myers Wolin, LLC

(57) ABSTRACT

The invention relates to a new type of quality of service architecture for a network assembly and a corresponding computer network system. The Internet technology as approved by the IETF organization has defined different services. One is the integrated services (IntServ) and the other the differentiated services (DiffServ) architecture. Another is the RSVP Protocol according to which Quality of Service can be implemented with accuracy and richer functionality.
The invention shows a way how less sophisticated QoS managers inside the network with only DiffServ or Intserv capability, can be used for enhancing the QoS functionality based on so-called RSVP shadowing messages, and easy to implement RSVP shadowing stacks.

15 Claims, 7 Drawing Sheets

| Guaranteed Service Header |
| Ctot (composed E2E) |
| Dtot (composed E2E) |
| Csum (composed since last reshaping point) |
| Dsum (composed since last reshaping point) |
| Csum (composed between reshaping points) |
| Dsum (composed between reshaping points) |
| Service-specific General Parameters |

METHOD FOR MANAGING DATA TRANSMISSION ACCORDING TO A QUALITY OF SERVICE IN A NETWORK ASSEMBLY AND A COMPUTER NETWORK SYSTEM

This application claims the benefit, under 35 U.S.C. §119 of EP Patent Application 08160378.9, filed 15 Jul. 2008.

FIELD OF THE INVENTION

The invention relates to a method for managing data transmission according to a Quality of Service in a network assembly and a computer network system.

BACKGROUND OF THE INVENTION

In addition to the traditional best-effort service provided by the Internet Protocol (IP) to traffic carried by it, there is a need for enhanced and controllable Quality of Service (QoS) for traffic of some kinds of applications. For example, real-time applications may need to obtain at least a minimum amount of bandwidth exclusively for their traffic to perform properly. QoS requirements may also include bounds on delay, jitter, or similar. The need for QoS has been addressed by the IETF through the definition of two QoS architectures: The Integrated Services (IntServ) and the Differentiated Services (DiffServ/DS) architecture.

The IntServ architecture ([RFC 1633], for all references see list "References" below) reserves QoS-related resources for individual data flows, in all compliant routers along the paths of the flows through an IP network. This reservation is typically performed by means of the Resource Reservation Protocol (RSVP; [RFC 2205]), which enables applications to explicitly request specific services, provide traffic- and service-related parameters, and get feedback whether or not a reservation has been established. IntServ services include the Controlled-Load service (CL; [RFC 2211]) and the Guaranteed service (GS; [RFC 2212]). Whereas the per-flow reservation is application-friendly, it limits the scaling properties of IntServ/RSVP in large networks (e.g., WANS, or the Internet core/backbone).

The DiffServ architecture ([RFC 2475]) provides QoS to aggregates of data flows instead of individual flows, with such aggregates identified by the DS codepoint (DSCP) marking in an IP packet header ([RFC 2474], [RFC 3260]). Moreover, it operates on network areas consistently configured to provide DiffServ-style QoS (so-called DS domains), pushing most of the complex traffic classification and management tasks to the edges of a DS domain, where these tasks are performed according to Service Level Agreements (SLAs) with an adjacent domain. Whereas this approach provides scaling properties suitable for large networks, it lacks the quantifiable per-flow QoS of IntServ/RSVP and does originally not provide QoS negotiation and feedback mechanisms. An approach to dynamic management of a DS domain, including communication with local hosts, and potentially with adjacent domains, is a so-called Bandwidth Broker (BB; [RFC 2638]), but no communication mechanism has been standardized for this approach.

As IntServ and DiffServ are somewhat complementary, a proper combination of both seems to be the most promising approach to an overall QoS architecture within the Internet ([RFC 2998]). This architecture uses IntServ/RSVP at the edges of the network, to provide quantifiable per-flow QoS negotiation and feedback to applications, but uses DiffServ mechanisms in the network core to provide scalability.

Another concept for interoperation of IntServ and DiffServ is RSVP Aggregation ([RFC 3175]), which uses in the network core aggregate RSVP reservations to which multiple end-to-end (E2E) reservations are mapped. Moreover, packets within aggregate reservations are identified by means of a DSCP marking, which is selected by the deaggregating router and reported to the aggregating router via an RSVP DCLASS object ([RFC 2996]).

Both IntServ/RSVP and DiffServ are conceptually designed for large-scale, sophisticated networks depending on layer 3 (L3) router functionality (RSVP routers, DiffServ border routers, etc.). Especially, RSVP reservations are in principle set up for the path to a downstream next-hop router. On the other hand, LANs typically mainly operate on layer 2 (L2) functionality (L2 switches/bridges, etc.). For example, a LAN may consist of several hosts connected by a switched Ethernet environment, with only a few routers or even one router being responsible for connection of the LAN to other networks or the Internet. To enable fine-grain RSVP operation in such environments, the concept of a Subnet Bandwidth Manager (SBM) has been introduced ([RFC 2814]).

Finally, a real deployment of QoS within the network(s) of a company needing some QoS support to enable certain applications must consider both the features and the costs of the equipment necessary to achieve a desired QoS level, as well as the features of the existing equipment. IntServ/RSVP is typically only supported by medium- to high-class routers, and many switches do not provide SBM support. On the other hand, many routers and switches provide DiffServ support, making it very tempting to use DiffServ for QoS in a less sophisticated environment. In the latter case, the non-standardized communication mechanism between hosts and DiffServ management entities must be defined to enable applications to issue QoS request and get feedback, and this mechanism must interoperate with the existing network equipment. Points of implementation of this mechanism can typically only be the hosts and the management entities, both of which can process company-specific network protocol software, whereas one would normally not be able to adapt the firmware and thus the behavior of intermediate network equipment.

[RFC 2638] describes the BB concept for management of a DS domain, with the BB functionality being quite similar to the functionality of the QoS Manager proposed by the invention. Both entities must perform management and configuration of the resources of the domain they are responsible for. According to [RFC 2638], a BB may configure the controlled network elements by means of a derivate of RSVP, SNMP, or a vendor-specific protocol. The QoS Manager of the invention is intended to use any suitable remote configuration interface of the network equipment it controls (e.g., SNMP, Telnet, or SSH). However, [RFC 2638] does not detail the communication mechanism needed for application-centric reservation setup and feedback. It simply states that a reservation request may be issued manually, or by means of some network administration or resource negotiation protocol. The invention fills this gap by using RSVP Shadowing as its communication mechanism.

[RFC 2638] further states that BBs of adjacent domains may communicate with each other for dynamic resource management, again without detailing the communication mechanism. In some embodiments of the invention, said communication is also performed via RSVP Shadowing.

Regarding the interoperation of DiffServ and BBs with RSVP, [RFC 2638] assumes that the boundary router of a DS domain might intercept RSVP messages and redirect them to the BB for admission control. Unfortunately, this would require changing the behavior of the boundary router, which is normally not achievable with of-the-shelf equipment. Instead, the invention uses direct RSVP Shadowing communication between a host and the QoS Managers, and potentially between adjacent QoS Managers.

[RFC 2998] describes a QoS architecture using IntServ/RSVP at its edges and DiffServ in its core, with the scope of IntServ/RSVP and DiffServ areas being largely variable. In one extreme case, the IntServ areas might only consist of the source and destination hosts of a data flow using reservation. The invention falls into this category, as it can use a specialized RSVP Shadowing implementation in the hosts (and, of course, in the QoS Managers) only, not in any legacy RSVP router. Therefore, it will typically disable RSVP processing in legacy routers inside of the DS domains, to facilitate consistent resource management by a QoS Manger. A difference of the invention to [RFC 2998] is that, at least in some embodiments, the invention also considers a sequence of DS domains interconnected by IntServ/RSVP sections, instead of the one coherent DiffServ area.

[RFC 2998] optionally allows for DSCP marking and preconditioning performed by trusted hosts on behalf of a DS region. As the sending host is the last network element capable of performing these actions in the invention's architecture, this behavior must be used by the invention. Furthermore, the operation of RSVP across a DS region requires that its DS areas export characterization parameters for update of the Advertising Specification (Adspec) carried by RSVP, which is also described in [RFC 2998]. The invention must naturally adhere to this requirement, too.

Concerning the management of a DS area by means of a BB, [RFC 2998] states that the border router of the DS area should participate in the RSVP signaling and communicate with the BB for admission control of a requested data flow. Like the approach assumed by [RFC 2638], this would typically require changing of the behavior of of-the-shelf equipment and hence not be feasible.

[RFC 3175] uses the DSCP of packets for classification within an RSVP aggregation region, with the DSCP chosen by a downstream, deaggregating router, as it first has available all information to select an appropriate DSCP, which is reported upstream by means an RSVP DCLASS object. In some embodiments, the invention similarly uses DSCP selection in a downstream domain and reporting to an upstream domain, to enable dynamic upstream DSCP re-marking.

[RFC 2814] uses a specialized SBM-compliant RSVP stack implementation, which redirects RSVP messages to the designated SBM (DSBM) responsible for an outbound link. The DSBM in turn forwards the message towards its destination, effectively inserting itself into the RSVP path. Whereas the RSVP Shadowing stack in a host using the invention similarly first contacts the local QoS Manager instead of forwarding RSVP messages towards the real destination, it uses specialized RSVP Shadowing messages for this purpose, instead of redirected "original" messages. Even in some embodiments of the invention in which RSVP Shadowing messages are processed hop by hop between QoS Managers, that chain of QoS Manager communication is built up for the RSVP Shadowing communication only, not for "original" E2E messages.

Within the network(s) of a company, deployment of QoS based on pure IntServ/RSVP requires a significantly high granularity of RSVP-capable routers, which is a costly approach. Alternatively, a lower granularity of RSVP routers in combination with SBM-compliant switches may be chosen, which is less costly, but still far more expensive than using DiffServ-capable switches and routers only. Unfortunately, quantifiable application-centric QoS requires some kind of resource request/negotiation protocol, a feature not standardized for a pure DiffServ approach. The current approaches for interoperation of IntServ/RSVP with DiffServ intended to fill this gap either require modification of network equipment, which may not be feasible with off-the-shelf equipment, or support of those extensions by current equipment, which is not widespread and would also increase the costs of the solution.

SUMMARY OF THE INVENTION

It is the object of the invention to provide an improved method for managing data transmission according to a Quality of Service in a network assembly and a computer network system.

The object is solved by a method for managing data transmission according to a Quality of Service in a network assembly according to an embodiment of the invention and a computer network system according to another embodiment of the invention.

According to one aspect of the invention, a method for managing data transmission according to a Quality of Service (QoS) in a network assembly by a QoS architecture implemented in the network assembly is provided, wherein the network assembly is provided with a plurality of host devices organized in a domain structure, each domain of the domain structure comprising a QoS managing device assigned to the domain, and wherein the method comprises the following steps managed by the QoS architecture using for information exchange a signal protocol:

for a proposed data transmission over the network assembly to a receiver host device, a resource request information is provided from a requesting host device to a receiving QoS managing device, in response to the resource request information, a response information is provided from the receiving QoS managing device to the requesting host device, wherein the response information comprises one of a resource reservation information indicating a resource reservation and a failure reservation information indicating a failure to reserve the requested resource, if the resource reservation is made, the resource reservation is maintained by a maintaining mechanism implemented by the QoS architecture, and the resource reservation is terminated after a termination is initiated by one of a termination information received by the receiving QoS managing device from the maintaining mechanism, a termination request provided by the requesting host device to the receiving QoS managing device, and a termination request provided by the QoS managing device by itself.

According to another aspect of the invention, a computer network system, comprising a plurality of host devices organized in a domain structure, and a Quality of Service (QoS) architecture, each domain of the domain structure comprising a QoS managing device assigned to the domain, wherein the QoS architecture is configured to manage a method for data transmission as outlined above.

In a preferred embodiment, the method further comprises a step of providing the maintaining mechanism according to one of the following procedures: soft state protocol procedure and hard state protocol procedure.

According to a further embodiment, the method comprises a step of initiating the resource request by one of a software application running on the requesting device, an embedded software, and a hardware device.

In still a further embodiment, the method comprises a step of reserving a plurality of sub resources in the network assembly by the resource reservation.

According to a preferred embodiment, the method comprises a step of assigning the plurality of sub resources to a logical end-to-end data communication.

In another preferred embodiment, the proposed data transmission comprises proposed data transfer over a plurality of domains of the domain structure.

In a preferred embodiment, the method comprises a step of sending the resource request information according to a sender model, thereby providing the resource request information from the requesting host device to a plurality of QoS managing devices assigned to the plurality of domains, the plurality of QoS managing devices comprising the receiving QoS managing device.

According to a further embodiment, the method comprises a step of sending the resource request information according to a hop model, thereby providing the resource request information from the requesting host device to a first QoS managing device which in turn provides the resource request information to the receiving QoS managing device directly or via remaining QoS managing devices assigned to the plurality of domains.

In still a further embodiment, the method comprises a step of providing reservation parameters by the requesting host device.

In an embodiment, the method comprises a step of providing further reservation parameters by the receiving QoS managing device.

In a further embodiment, the method comprises a step of providing additional reservation parameters by the receiver host device.

According to a further embodiment, the method comprises a step of adapting the reservation parameter after reception of one of the further reservation parameters and the additional reservation parameters by the requesting host device.

In an embodiment, the method comprises a step of adapting the reservation parameters after reception of one of the further reservation parameters and the additional reservation parameters by a QoS managing device different from the receiving QoS managing device.

In a preferred embodiment, the QoS architecture is configured to support "Integrated Services in the Internet Architecture".

According to a further embodiment, the method comprises a step of using an extended "Resource Reservation Protocol" as the signal protocol for the information exchange by the QoS architecture.

In a preferred embodiment, an advantage of the invention is the possibility to use an IntServ-style reservation scheme across a set of DiffServ network domains of a company, with these domains mostly using simple and cheap legacy DiffServ network equipment, which may well be worth the costs of implementing the RSVP Shadowing stacks and the QoS Managers. Moreover, the architecture proposed by the invention concentrates all non-legacy QoS functionality in these two software blocks, making it a good platform for experiments with and/or deployment of company-specific QoS scenarios. For such specifically tailored scenarios, the standardized IntServ/DiffServ interoperation architectures might not be suitable or might be far to heavy-weight, even if they were financially feasible.

In a preferred embodiment, it is assumed that the resources of each DS domain of a company network are managed by a local QoS Manager, which is capable of monitoring the actual resource usage within the managed domain, and able to configure the network equipment of the domain according to QoS requests issued by hosts, or by QoS Managers of adjacent domains. This will typically require that the domain's topology is unambiguous regarding the path a data flow may follow through the domain, which can be achieved, e.g., by a simple branched tree topology. The QoS requests and replies are transferred between hosts and QoS managers by means of RSVP, using special extensions implemented by an enhanced RSVP Shadowing stack running on each host of a managed domain, and on the QoS Manager responsible for that domain. Depending on the embodiment of the invention, each logical or real E2E RSVP reservation is associated with one or more "shadow" reservations used for negotiation of QoS requirements between hosts and QoS Managers. Moreover, the RSVP Shadowing messages are used to gather Intserv-style characterization parameters synthesized by the QoS Manager according to the current properties of the managed DS domain. Finally, the (optional) use of real E2E RSVP signaling enables the invention to interoperate with legacy RSVP-managed segments along the data path, e.g., within the connection(s) of DS domains, or within partly RSVP-managed domains. The RSVP Shadowing mechanism is in principle transparent to applications, i.e., these may operate as if legacy RSVP functionality were provided by the RSVP Shadowing stacks. On the other hand, an RSVP Shadowing stack may provide additional functionality compared to a legacy RSVP implementation, e.g., additional services, at least in some embodiments of the invention. Besides said enhanced RSVP Shadowing stacks, the invention does not require modifications within the network, hence simple and cheap legacy network equipment can be used, in contrast to the more sophisticated equipment needed to deploy a similar solution according to the IntServ/DiffServ interoperation architectures proposed by the RFCs described above. However, the implementation of the RSVP Shadowing stacks and the functionality of QoS Managers may be complex. Especially the network resource monitoring and configuration functionality of the QoS Managers might be complex, as it totally depends both on the variety of deployed network equipment and on the complexity of resource management of each particular type of equipment. The latter may include, e.g., monitoring/setting of properties like access control lists, DSCP (re)mapping tables, packet filters, scheduling parameters, etc.

BRIEF DESCRIPTION OF THE DRAWINGS

In the following, the invention will be described by means of advantageous embodiments with reference to figures. Herein.

DESCRIPTION OF THE PREFERRED EMBODIMENTS

Figure 1:
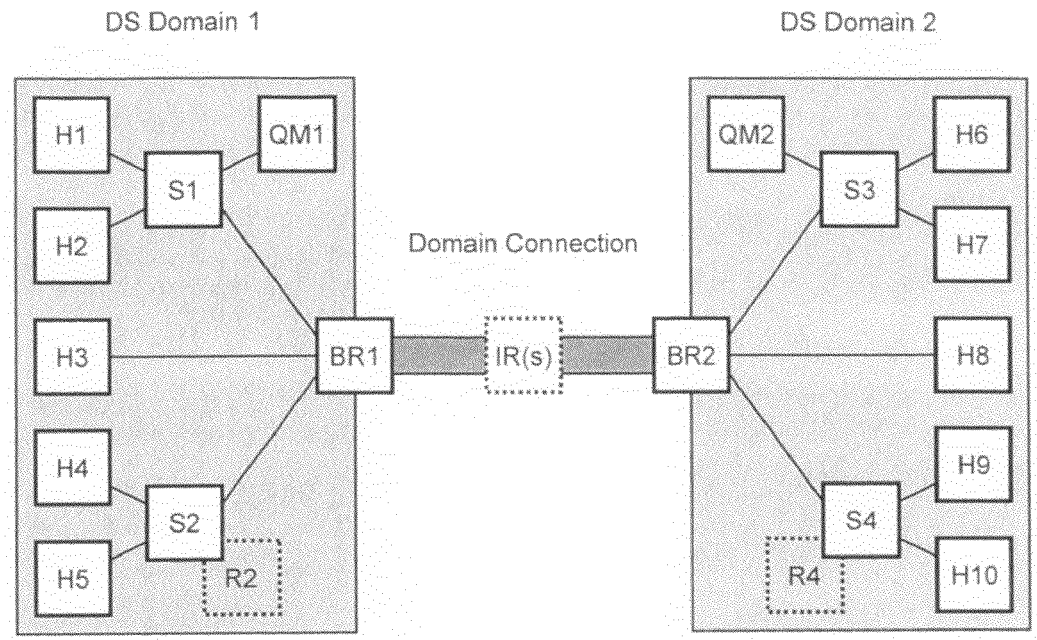
FIG. 1 a schematic presentation of a company computer network.

Embodiments of the invention will mainly be described with reference to an example company network shown in FIG. 1. This network consists of two DS domains (e.g., two sites of a company, or two departments within the same facility) each of which is managed by a local QoS Manager (QM). The domains are interconnected through a domain connection between the boundary routers (BRs) of the domains. Depending on the type of connection (e.g., dark fiber, leased line, VPN tunnel), the domain connection may or may not include one or multiple intermediate routers (IRs). To ease the management and configuration tasks of the QMs, each DS domain uses an unambiguous branched tree topology. The hosts within each DS domain will typically be interconnected via DiffServ-capable L2 switches, except for the BR, which may be part of an internal switching path. Optionally, there might be domain-internal DiffServ-capable routers (R2, R4) instead of some switches (S2, S4), but typically RSVP processing (if available) will be disabled in such routers. All hosts and QMs within the DS domains use the enhanced RSVP Shadowing stack to perform extended RSVP processing according to the invention.

A.1. Signaling Concept

RSVP couples the resource reservation signaling path with the data path, i.e., RSVP Path and Resv messages are intentionally routed along the same path as a corresponding data flow, to configure resources all along that data path. Whereas there are concepts for re-routing RSVP messages to a central management entity (e.g., a BB or SBM), these typically require modification of a network element's behavior, or explicit support of the respective concept. As the invention is designed to operate with off-the-shelf equipment, such re-routing is not feasible. Instead, when a host requests establishment of an E2E RSVP reservation, the RSVP Shadowing stack of the host uses RSVP Shadowing messages to communicate with the local QM, and possibly with QMs of further affected DS domains, in the "shadow" of the real or logical E2E RSVP communication. A shadow Path message is used as a reservation request to a QM. The QM sends back towards the requesting host or QM a shadow Resv message as a reservation confirmation, or a shadow PathErr message as a reservation rejection. Shadow Path and Resv messages are sent periodically to refresh related state information, as usual for RSVP. An established shadow reservation can be torn down explicitly via shadow PathTear or ResvTear messages, or automatically via the RSVP state timeout mechanism. As the invention is intended to interoperate with legacy RSVP, RSVP Shadowing messages must be designed to pass through legacy RSVP equipment. Hence all message extensions specific to RSVP Shadowing must be encapsulated into standard RSVP messages by means of vendor-private "ignore and forward" objects. As RSVP Shadowing may need more extension objects than available at the top level of the object hierarchy (only Class-Nums 252-255 are reserved for the necessary behavior), the invention uses one general RSVP Shadowing extension object with an appropriate set of sub-objects.

A QM must be able to associate the state established by RSVP Shadowing messages with the state of the corresponding E2E reservation. For example, if the path state of a shadow reservation is torn down or times out, the QM must reclaim the resources allocated to the corresponding E2E reservation. One possibility for such association would be to use different sessions for each shadow reservation, which would typically mean using different destination ports for the session identification, as the choice of the protocol ID is far more limited and the destination address must naturally be the one of the QM. However, this approach would hamper interoperation of multiple hosts with a specific QM, as one host cannot easily know which ports are already used by other hosts. Therefore, the invention uses for each QM a single session for all shadow reservations, or at least for all domain-local shadow reservations, and distinguishes the shadow reservations through the sender templates (sender address and source port, the latter to distinguish multiple reservations of one host). For RSVP compliance, this in turn requires using a specific, non-zero destination port, but this destination port can be chosen arbitrarily, as long as at least all hosts of the local domain know its number. For simplicity and minimization of resource usage (see below), a company may use the same destination port for all QMs within its domains.

The shadow reservations must use a standard IntServ service type, i.e., CL or GS, to ensure that the shadow Resv messages are not rejected by legacy RSVP equipment. As all IntServ/RSVP-capable equipment should support both services, the choice is in principle a matter of taste, but the invention uses CL due to the lower RSVP overhead (smaller Adspec, easier Adspec processing, no Rspec, etc.). Regarding the reservation style, WF is out of question due to its feature to automatically extend to new senders within a session, whereas RSVP Shadowing requires that a QM performs explicit admission control for each new shadow Path message and places related information into the corresponding shadow Resv message. In principle, SE and FF would both be feasible, but the invention uses SE to minimize the resource usage of the shadow reservations (maximum of all requests for SE, sum of all requests for FF), although shadow reservations should anyway use negligible "minimal" Tspecs, e.g., a token bucket rate of 1 kbps, token bucket and maximum packet sizes of 128 byte, a minimum policed unit of 64 byte, and an infinite peak rate.

This minimization of resources allocated to the shadow reservations may be helpful if RSVP Shadowing messages are processed by legacy RSVP equipment, e.g., by an active domain-internal RSVP router, by a BR as part of an internal switching path, or within a domain connection managed via RSVP. After all, these reservations are dummy reservations, as they are established only to manage shadow path and reservation state on behalf of corresponding E2E reservations, but there should never be any traffic actually using these reservations. To minimize the probability of actual traffic matching shadow reservations and hence potentially being affected by legacy RSVP routers, a shadow session should use a protocol ID and a destination port that are very unlikely to be used for real traffic. Therefore, the invention uses one of the experimental protocol IDs, i.e., 253 or 254 ([RFC 3692]), and corresponding port numbers not used for real traffic in any affected domain of a company network. It should be noted that using different protocol IDs and/or port numbers for one QM or different QMs is possible, e.g., to distinguish local and remote shadow reservations, or even shadow reservations from different remote domains, but that multiple shadow sessions may apply to a single network path in this case, potentially leading to multiple minimal Tspecs being reserved along that path.

A.2. Message Formats

This section shows message formats of various RSVP Shadowing messages and describes the contents of the objects comprised in these messages. For all messages, the RSVP Shadowing extensions are highlighted through gray shading, and optional message components are shown with dashed borders. Furthermore, only the basic contents of each message are shown, i.e., only objects and sub-objects needed for general operation of the invention, without special enhancements (see section A.3.2).

A.2.1. Shadow Path Message

Figure 2:
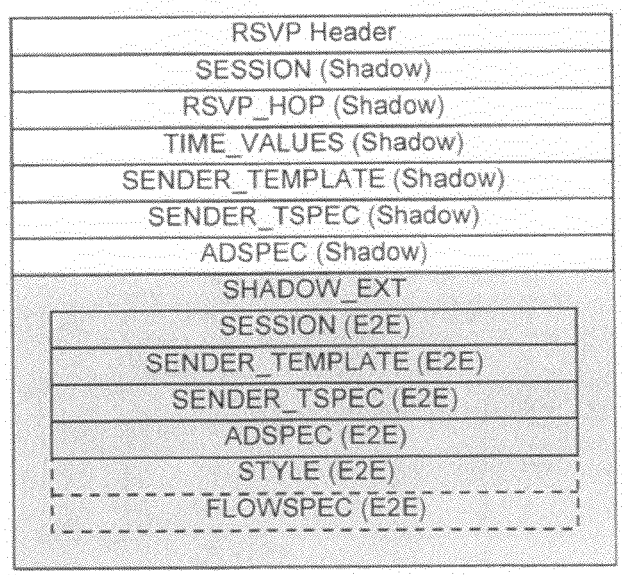
FIG. 2 representation of shadow Path message.

FIG. 2 shows the basic contents of a shadow Path message. The message starts with the standard RSVP header, followed by the standard RSVP objects required for a Path message. All these standard objects contain information corresponding to the shadow reservation. After these, an RSVP Shadowing extension object is appended, which in turn comprises sub-objects containing information corresponding to the E2E reservation. For simplicity, these sub-objects use the same format as standard RSVP objects. This does not cause any ambiguity as legacy RSVP equipment does not interpret the content of the extension object, but just saves it for forwarding it in any RSVP message resulting from an initial message.

Assuming that, with reference to FIG. 1, host H4 sends a shadow Path message to the local QoS Manager QM1 to start setting up an E2E reservation to host H9, the RSVP objects will contain the following information:

- SESSION (Shadow): Comprises the shadow session identification, i.e., the IP address of QM1, and the experimental protocol ID and the shadow destination port used for QM1. The flag field is currently not used by the invention.
- RSVP_HOP (Shadow): Contains, as usual for RSVP, the PHOP information of H4, i.e., the IP address of H4, and the LIH associated with the interface the shadow Path message is sent from by H4.
- TIME_VALUES (Shadow): Indicates the refresh interval of the shadow Path message at H4, as usual for RSVP.
- SENDER_TEMPLATE (Shadow): Comprises the shadow sender identification of H4, i.e., the IP address of H4, and a shadow source port uniquely selected for the shadow reservation to be established, to distinguish this reservation from other shadow reservations between H4 and QM1.
- SENDER_TSPEC (Shadow): This is the minimal Tspec already described in section A.1. This trick has been chosen to provide a Tspec parameter as required by RSVP, but with negligible waste of resources within legacy RSVP equipment.
- ADSPEC (Shadow): Contains, as usual for RSVP, the mandatory general Adspec parameters, i.e., the IntServ hop count, the path bandwidth, the minimal path latency, and the path MTU, with the path-related parameters filled out according to the properties of the interface the shadow Path message is sent from by H4. Additionally, it contains a CL service fragment, with its break bit cleared. First, this is done to provide a reasonable Adspec (although RSVP does not explicitly prohibit Adspecs without service fragments). Second, this enables QM1 to detect whether legacy RSVP equipment on the path from H4 does not support CL (very unlikely, except for misconfiguration), and to inform H4 about this problem.
- SESSION (E2E): Comprises the E2E session identification, i.e., the IP address of H9, and the protocol ID and destination port to be used for the E2E data flow for which the E2E reservation is to be established. The flag field is currently not used by the invention (see section "Background of the invention" above, the sending host is responsible for pre-conditioning of its traffic).
- SENDER_TEMPLATE (E2E): Contains the E2E sender identification of H4, i.e., the IP address of H4, and the source port to be used for the E2E data flow for which the E2E reservation is to be established.
- SENDER_TSPEC (E2E): This is the Tspec indicating the properties of the E2E data flow for which the E2E reservation is to be established.
- ADSPEC (E2E): Contains the mandatory general Adspec parameters, as usual for RSVP, with the path-related parameters filled out according to the properties of the interface the E2E data flow for which the E2E reservation is to be established will be sent from by H4. Additionally, it contains service fragments for all services H4 is able and willing to support for the E2E reservation, with the comprised service-specific parameters also set according to the properties of the interface the E2E data flow for which the E2E reservation is to be established will be sent from by H4.

Additionally, a shadow Path message may contain the following information, which will typically not be included within an initial shadow Path message:

- STYLE (E2E): Indicates the reservation style (to be) used for the E2E reservation.
- FLOWSPEC (E2E): Indicates the service type (to be) used for the E2E reservation, and comprises the Tspec parameters, and potentially the Rspec parameters, for which the E2E reservation is to be or has been established.

In principle, the latter objects are intended for adjustment of established shadow reservations after reception of an E2E Resv message for the corresponding E2E reservation (see section A.3.2). In this case, these objects will simply be copies of the respective objects of that E2E Resv message. However, if a host has any a-priori knowledge, or at least a highly probable assumption, of the reservation style and/or the flowspec parameters that will be used for the E2E reservation (e.g., from already established reservations within the same E2E session, through configuration, or via some out-of-band mechanism), one or both of these objects may also be included within an initial shadow Path message. In case an E2E FLOWSPEC object is provided by any shadow Path message, the message's E2E ADSPEC object must not include any service fragments not corresponding to the service indicated by the E2E FLOWSPEC object.

A.2.2. Shadow Resv Message

Figure 3:
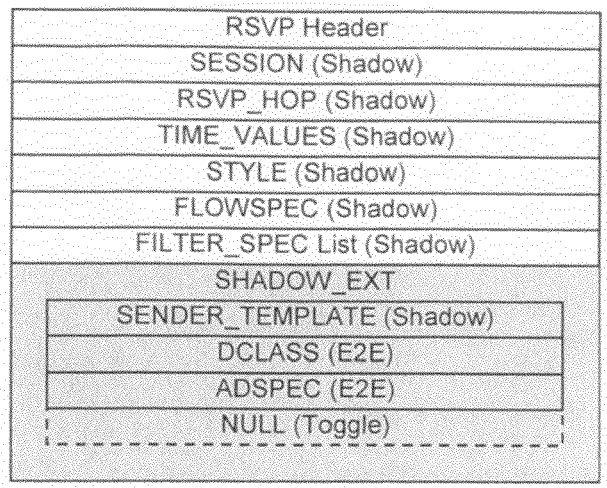
FIG. 3 schematic representation of a shadow Resv message.

FIG. 3 shows the basic contents of a shadow Resv message. The message starts with the standard RSVP header, followed by the standard RSVP objects required for a Resv message. All these standard objects contain information corresponding to the shadow reservation. After these, an RSVP Shadowing extension object is appended, which in turn comprises sub-objects containing information corresponding to the shadow or E2E reservation, respectively, and optionally an auxiliary NULL object. Again, the sub-objects use the standard RSVP format.

Assuming that QM1 sends a shadow Resv message in response to the shadow Path message described in section A.2.1, the RSVP objects will contain the following information:

SESSION (Shadow): Comprises the shadow session identification, i.e., the IP address of QM1, and the experimental protocol ID and the shadow destination port used for QM1. The flag field is currently not used by the invention. Hence this object is simply a copy of the shadow SESSION object of the corresponding shadow Path message.

RSVP_HOP (Shadow): Contains, as usual for RSVP, the NHOP information of QM1, i.e., the IP address of QM1, and the LIH associated with the interface the corresponding shadow Path message was sent from by the previous RSVP node, which is copied from the shadow RSVP_HOP object of that shadow Path message. That previous RSVP node may be H4, R2, or BR1, depending on the presence and/or RSVP activity of the latter two.

TIME_VALUES (Shadow): Indicates the refresh interval of the shadow Resv message at QM1, as usual for RSVP.

STYLE (Shadow): Indicates the SE reservation style to be used for the shadow reservation.

FLOWSPEC (Shadow): Indicates the CL service to be used for the shadow reservation, and comprises the Tspec parameters for which the shadow reservation is to be established. This should again be the minimal Tspec already described in section A.1, unless the general parameters of the shadow ADSPEC object of the corresponding shadow Path message indicate that smaller values for some parameters (e.g., token bucket rate, maximum packet size) must be used to ensure delivery of the shadow Resv message, which is very unlikely.

FILTER_SPEC List (Shadow): Contains a list of FILTER_SPEC objects corresponding to the shadow SENDER_TEMPLATE objects from all shadow Path messages for which a shadow reservation is currently established at QM1, within the indicated shadow session, including the FILTER_SPEC object corresponding to the shadow SENDER_TEMPLATE object of the shadow Path message in response to which the shadow Resv message is sent by QM1.

SENDER_TEMPLATE (Shadow): Comprises the shadow sender identification of H4, i.e., the IP address of H4, and the shadow source port uniquely selected for the shadow reservation to be established, to distinguish this reservation from other shadow reservations between H4 and QM1. Hence this object is simply a copy of the shadow SENDER_TEMPLATE object of the shadow Path message in response to which the shadow Resv message is sent by QM1. This object is necessary to indicate for which sender the following E2E-related information is valid, as the shadow Resv message might be forwarded to all senders for which a shadow reservation is currently established at QM1, within the indicated shadow session, due to the possibly changed content of the RSVP Shadowing extension object.

DCLASS (E2E): Indicates the DSCP to be placed into the IP header of packets of the E2E data flow for which the E2E reservation is to be established, to be mapped to a PHB appropriately configured by QM1 within its domain to achieve the QoS desired for the E2E data flow as expressed by the E2E parameters within the corresponding shadow Path message. If the E2E ADSPEC object of the corresponding shadow Path message contains multiple service fragments, the DCLASS object will contain a list of DSCPs, with each DSCP corresponding to a particular service. The 1:1 association between service and DSCP is given by the same position of the respective entry in the sequence of entries, i.e., the first DSCP corresponds to the first service fragment, etc.

ADSPEC (E2E): Contains composed E2E Adspec parameters, based on the E2E Adspec parameters provided by the corresponding shadow Path message, composed with the Adspec parameters resulting from the usage of the specified DSCP(s) within QM1's domain, for the E2E data flow for which the E2E reservation is to be established. The general parameter IntServ hop count will not have been changed, but the path-related general parameters, and the service-specific parameters within the service fragments, will have been modified according to the properties of QM1's domain along the path the E2E data flow will follow.

Additionally, a shadow Resv message may contain the following information:

NULL (Toggle): This is a NULL object comprising an RSVP object header only, with the C-Type field set to an arbitrary value. This object is intended to enforce immediate forwarding of otherwise unchanged shadow Resv messages. On adjustment of shadow reservations (see section A.3.2) or changing of shadow reservations due to updated reservation requests from applications, all other objects of a shadow Resv message may have identical contents compared to a previously sent shadow Resv message, which would lead to the message being interpreted as refresh message, whereas the message is intended to immediately confirm a change of a shadow reservation. To avoid this misinterpretation, the sender of such a message must include this object if it was not present in the previous shadow Resv message, or remove it otherwise, effectively toggling the presence of the object within any otherwise unchanged shadow Resv message intended for immediate forwarding.

It should be noted that the use of one shadow session for at least all domain-local senders, which in turn requires including in each shadow Resv message the complete list of FILTER_SPEC objects corresponding to all senders for which a shadow reservation is currently established at a QM, within that shadow session, represents a potential scaling limit to the number of shadow reservations concurrently supportable by a QM, as the size of a shadow Resv message should not lead to fragmentation of the message. With IPv4, this issue seems to be less problematic as an IPv4 FILTER_SPEC object has a size of 8 bytes only. Furthermore, IPv4 would typically support fragmentation and reassembly of shadow Resv messages as they are directly sent to the previous-hop RSVP node. On the other hand, with IPv6 using 20-byte FILTER_SPEC objects and not supporting fragmentation, this issue might be more problematic. A possible workaround to this problem is the use of different protocol IDs and/or port numbers to establish multiple shadow sessions with a particular QM as described in section A.1, but with a subset of the local hosts assigned to each shadow session. However, as the invention is anyway intended to be used for a limited number of data flows only, this issue is assumed not to be a serious problem.

A.2.3. Shadow PathErr Message

Figure 4:
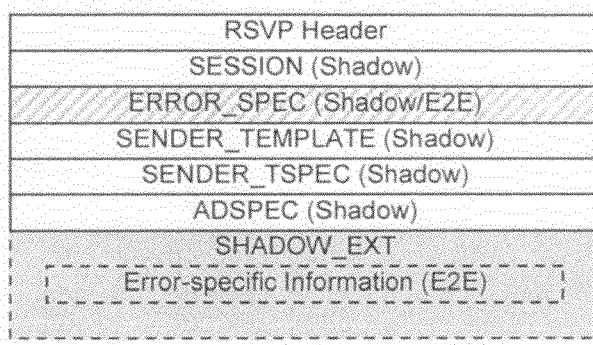
FIG. 4 a schematic representation of a shadow PathErr message.

FIG. 4 shows the basic contents of a shadow PathErr message. The message starts with the standard RSVP header, followed by the standard RSVP objects required for a PathErr message. All these standard objects contain information corresponding to the shadow reservation, except for the ERROR_ SPEC object, which may comprise information corresponding to the shadow or E2E reservation, depending on the cause of the error. After these, an RSVP Shadowing extension object may be appended for errors corresponding to the E2E reservation, which in turn comprises sub-objects containing additional error-specific information.

Assuming a shadow PathErr message corresponding to the shadow Path message described in section A.2.1, the RSVP objects will contain the following information:

SESSION (Shadow): Comprises the shadow session identification, i.e., the IP address of QM1, and the experimental protocol ID and the shadow destination port used for QM1. The flag field is currently not used by the invention. Hence this object is simply a copy of the shadow SESSION object of the corresponding shadow Path message.

ERROR_SPEC (Shadow): In case that an error corresponding to the shadow reservation is to be reported, this object will contain the IP address of the RSVP node that detected the error condition, a standard RSVP error code permitted for a PathErr message, and a globally defined error value defined for that error code (e.g., a "Traffic Control Error" error code, and a "Bad Tspec value" error value), as usual for RSVP. The error-detecting RSVP node may be R2, BR1, or QM1, depending on the presence and/or RSVP activity of the first two. This kind of shadow PathErr message should in principle only occur due to misconfiguration or misbehavior of an RSVP node (legacy, or RSVP-Shadowing-enabled), making it very unlikely.

ERROR_SPEC (E2E): In case that an error corresponding to the E2E reservation is to be reported, this object will contain the IP address QM1, and an RSVP-Shadowing-specific error code and error value. One approach to define error codes and values specific to RSVP Shadowing would be to use a standard RSVP error code permitted for a PathErr message (e.g., a "Traffic Control Error" error code), and an error value from the "organization-specific" range of values, with an RSVP-Shadowing-specific meaning. Another approach would be to use a vendor-private error code, i.e., an error code with a value of 252-255, and an arbitrary error value with an RSVP-Shadowing-specific meaning. As the latter approach is more flexible and avoids ambiguities due to the requirement to qualify vendor-specific error codes with a unique SMI enterprise code, the invention uses the vendor-specific approach. A possible way for definition of a suitable set of RSVP-Shadowing-specific error values would be to mimic the standard RSVP error code and value scheme by subdividing the vendor-specific error value into an "error code" and an "error value" part, and reusing the standard RSVP codes/values to express similar error conditions, as far as possible.

SENDER_TEMPLATE (Shadow), SENDER_TSPEC (Shadow), ADSPEC (Shadow): These objects are simply copies of the respective objects of the corresponding shadow Path message, as usual for RSVP.

Error-specific Information (E2E): This information may comprise any number of sub-objects, which may use the same format as standard RSVP objects, or some RSVP-Shadowing-specific format. These sub-objects are intended to provide helpful information in addition to the error value, if applicable. This may be additional information about the reported error condition, or information how to circumvent the error condition. For example, if an admission control error is reported because of a too large E2E Tspec, this information may include a SENDER_TSPEC object indicating the maximum E2E Tspec currently sustainable to the desired destination. If admission control fails because of an unsupported service, this information may include a list of supported services, in any appropriate format.

As PathErr messages do not delete path state in RSVP nodes they pass through, H4 may send a shadow PathTear message in response to a received shadow PathErr message to clean up potentially partially installed path state, unless it will anyway send an updated shadow Path message instead. Alternatively, H4 might simply rely on the RSVP state timeout mechanism automatically cleaning up such state after a while, provided that H4 does not perform refreshing of failed shadow Path messages.

A.2.4. Shadow ResvErr Message

Figure 5:
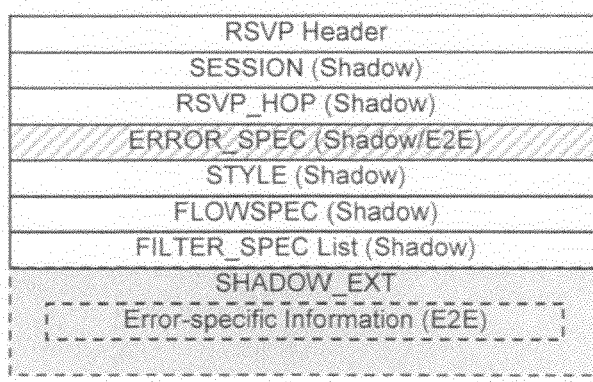
FIG. 5 a schematic representation of a format of a shadow ResvErr message.

FIG. 5 shows the basic contents of a shadow ResvErr message. The message starts with the standard RSVP header, followed by the standard RSVP objects required for a ResvErr message. All these standard objects contain information corresponding to the shadow reservation, except for the ERROR_SPEC object, which may comprise information corresponding to the shadow or E2E reservation, depending on the cause of the error. After these, an RSVP Shadowing extension object may be appended for errors corresponding to the E2E reservation, which in turn comprises sub-objects containing additional error-specific information.

Assuming a shadow ResvErr message corresponding to the shadow Resv message described in section A.2.2, the RSVP objects will contain the following information:

SESSION (Shadow): Comprises the shadow session identification, i.e., the IP address of QM1, and the experimental protocol ID and the shadow destination port used for QM1. The flag field is currently not used by the invention. Hence this object is simply a copy of the shadow SESSION object of the corresponding shadow Resv message.

RSVP_HOP (Shadow): Initially contains, as usual for RSVP, the PHOP information of the RSVP node that detected the error condition, i.e., the IP address of that node, and the LIH associated with the interface the shadow ResvErr message is sent from by that node. The error-detecting RSVP node may be BR1, R2, or H4, depending on the presence and/or RSVP activity of the first two.

ERROR_SPEC (Shadow): In case that an error corresponding to the shadow reservation is to be reported, this object will contain the IP address of the RSVP node that detected the error condition, a standard RSVP error code permitted for a ResvErr message, and a globally defined error value defined for that error code (e.g., an "Admission Control Failure" error code, and a "Requested bandwidth unavailable" error value), as usual for RSVP. The error flags are also treated as usual for RSVP. The error-detecting RSVP node may be BR1, R2, or H4, depending on the presence and/or RSVP activity of the first two. Except for admission control errors, this kind of shadow ResvErr message should in principle only occur due to misconfiguration or misbehavior of an RSVP node (legacy, or RSVP-Shadowing-enabled), making it very unlikely. Due to the usage of SE reservation style and minimal Tspecs for the shadow reservations (see section A.1), even an admission control error is quite unlikely.

ERROR_SPEC (E2E): In case that an error corresponding to the E2E reservation is to be reported, this object will contain the IP address of H4, and an RSVP-Shadowing-specific error code and error value. The error flag field is currently not used by the invention. The definition of the error codes and values follows the vendor-specific approach already described in section A.2.3. For general operation of the invention, most of the error conditions leading to standard ResvErr messages (e.g., admission control error, missing/mismatching state information, style/service conflict, traffic control error) should not occur for the E2E reservation, as the invention does not manage state information for the E2E reservation, but only the QM-internal association between shadow and E2E reservation, does not provide within shadow Resv messages style or service parameters related to the E2E reservation, and already initiates DiffServ-style reservation within a QM's domain in response to the initial shadow Path message, leading to admission and traffic control errors being reported by shadow PathErr messages instead. The only evident error condition would occur if QM1 used within the RSVP Shadowing extension object of the corresponding shadow Resv message sub-objects that H4 cannot interpret, leading to some kind of "Unknown object format/content" indication. However, this would require that H4 and QM1 execute somehow incompatible RSVP Shadowing stacks, or stacks compliant to different versions of the invention, making this kind of shadow ResvErr message very unlikely.

STYLE (Shadow): This object is simply a copy of the shadow STYLE object of the corresponding shadow Resv message, as usual for RSVP.

FLOWSPEC (Shadow): This object is simply a copy of the shadow FLOWSPEC of the corresponding shadow Resv message, as usual for RSVP for the SE reservation style used by the invention.

FILTER_SPEC List (Shadow): Contains a list of FILTER_SPEC objects corresponding to the shadow SENDER_TEMPLATE objects from all shadow Path messages for which a shadow reservation could not be established along the path(s) to the respective sender(s), within the indicated shadow session. This list may be the same as the FILTER_SPEC list of the corresponding shadow Resv message, or a subset of that list. Assuming that QM1 individually updates the shadow reservation of the indicated shadow session with each received initial shadow Path message, this list will typically only contain the FILTER_SPEC object corresponding to the SENDER_TEMPLATE object of the latest Path message received for said shadow session.

Error-specific Information (E2E): This information may comprise any number of sub-objects, which may use the same format as standard RSVP objects, or some RSVP-Shadowing-specific format. These sub-objects are intended to provide helpful information in addition to the error value, if applicable. This may be additional information about the reported error condition, or information how to circumvent the error condition. For example, if an error due to a non-interpretable sub-object within the RSVP Shadowing extension object of the corresponding shadow Resv message is reported by H4, this information may include a copy of that object, to enable QM1 to analyze the error condition in more detail.

As ResvErr messages do not delete (but may blockade) reservation state in RSVP nodes they pass through, QM1 may send a shadow ResvTear message in response to a received shadow ResvErr message to clean up potentially partially installed reservation state, unless it will anyway send an updated shadow Resv message instead. Alternatively, QM1 might simply rely on the RSVP state timeout mechanism automatically cleaning up such state after a while, provided that QM1 does not perform refreshing of failed shadow Resv messages.

A.2.5. Shadow PathTear Message

Figure 6:
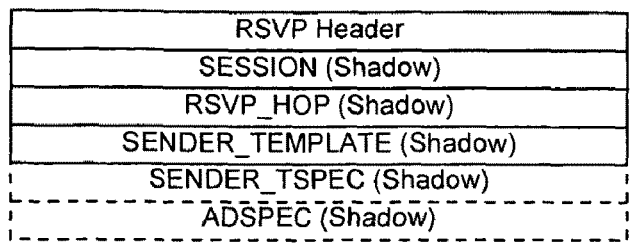
FIG. 6 a schematic representation of a format of a shadow PathTear message.

FIG. 6 shows the basic contents of a shadow PathTear message. At this time, the invention does not use RSVP Shadowing extensions for this message type. The message starts with the standard RSVP header, followed by the standard RSVP objects required for a PathTear message and some objects that might be included (see below). All these standard objects contain information corresponding to the shadow reservation.

Assuming that H4 sends a shadow PathTear message corresponding to the shadow Path message described in section A.2.1, to request QM1 to tear down the associated E2E reservation, the RSVP objects will contain the following information:

SESSION (Shadow): Comprises the shadow session identification, i.e., the IP address of QM1, and the experimental protocol ID and the shadow destination port used for QM1. The flag field is currently not used by the invention. Hence this object is simply a copy of the shadow SESSION object of the corresponding shadow Path message.

RSVP_HOP (Shadow): Contains, as usual for RSVP, the PHOP information of H4, i.e., the IP address of H4, and the LIH associated with the interface the shadow PathTear message is sent from by H4. To successfully tear down the shadow reservation to be or having been established by the corresponding shadow Path message, this object must be a copy of the RSVP_HOP object of that message.

SENDER_TEMPLATE (Shadow): Comprises the shadow sender identification of H4, i.e., the IP address of H4, and the shadow source port uniquely identifying the shadow reservation to be torn down, to distinguish this reservation from other shadow reservations between H4 and QM1. Hence this object is simply a copy of the shadow SENDER_TEMPLATE object of the corresponding shadow Path message.

SENDER_TSPEC (Shadow), ADSPEC (Shadow): If present, these objects will simply be copies of the respective objects of the corresponding shadow Path message, as usual for RSVP. To spare bandwidth, the invention should not use these optional RSVP objects, unless legacy RSVP equipment on the path to QM1 needs them (quite unlikely, as such equipment would not be fully RSVP-compliant).

A.2.6. Shadow ResvTear Message

Figure 7:
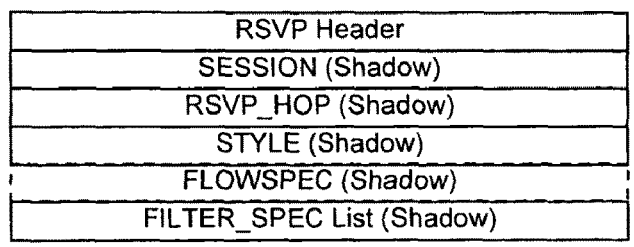
FIG. 7 a schematic representation of a format of a shadow ResvTear message.

FIG. 7 shows the basic contents of a shadow ResvTear message. At this time, the invention does not use RSVP Shadowing extensions for this message type. The message starts with the standard RSVP header, followed by the standard RSVP objects required for a ResvTear message and an object that might be included (see below). All these standard objects contain information corresponding to the shadow reservation.

Assuming that QM1 sends a shadow ResvTear message corresponding to the shadow Resv message described in section A.2.2, to request H4 to stop sending the E2E data flow on behalf of which a shadow reservation has been established, the RSVP objects will contain the following information:

SESSION (Shadow): Comprises the shadow session identification, i.e., the IP address of QM1, and the experimental protocol ID and the shadow destination port used for QM1. The flag field is currently not used by the invention. Hence this object is simply a copy of the shadow SESSION object of the corresponding shadow Resv message.

RSVP_HOP (Shadow): Contains, as usual for RSVP, the NHOP information of QM1, i.e., the IP address of QM1, and the LIH associated with the interface the corresponding shadow Path message was sent from by the previous RSVP node, which has been stored from the shadow RSVP_HOP object of that shadow Path message. That previous RSVP node may be H4, R2, or BR1, depending on the presence and/or RSVP activity of the latter two.

STYLE (Shadow): Indicates the SE reservation style used for all shadow reservations.

FLOWSPEC (Shadow): If present, this object will simply be a copy of the shadow FLOWSPEC object of the latest shadow Resv message sent by QM1 for the indicated shadow session, which has been stored from that message. To spare bandwidth, the invention should not use this optional RSVP object, unless legacy RSVP equipment on the path to H4 needs it (quite unlikely, as such equipment would not be fully RSVP-compliant).

FILTER_SPEC List (Shadow): Contains a list comprising a single FILTER_SPEC object corresponding to the shadow SENDER_TEMPLATE object from a shadow Path message for which a shadow reservation currently established between H4 and QM1, within the indicated shadow session, should be torn down. This teardown in turn requests H4 to stop sending the E2E data flow on behalf of which that shadow reservation has been established.

A QM may also choose to request multiple hosts to stop sending multiple E2E data flows at one time, using a shadow ResvTear message with a FILTER_SPEC list including FILTER_SPEC objects corresponding to all shadow reservations to be torn down.

There is a reliability issue with shadow ResvTear messages, as the messages; like any RSVP message, are not transmitted reliably. Therefore, a QM cannot normally be sure whether a shadow ResvTear message reached all intended hosts, but must reclaim the resources allocated to the E2E reservations corresponding to the torn down shadow reservations, at least after some timeout, to avoid permanent blocking of resources. This might lead to hosts still sending E2E data flows for which no E2E reservation is established any more, without proper notification to those hosts. Whereas the RSVP state cleanup mechanism will finally ensure delivery of initially lost shadow ResvTear messages, the RSVP cleanup time might be longer than any suitable reservation holding time implemented by QMs.

Therefore, RSVP Shadowing stacks should respond to a received shadow ResvTear message by sending, after notifying affected sending applications about the teardown, corresponding shadow PathTear messages back to the QM that once initiated the shadow ResvTear message, to provide a basic teardown acknowledgement. For sure, those shadow PathTear messages might also be lost, but a received shadow PathTear message enables the QM to reclaim the resources of the corresponding E2E reservation immediately, at least minimizing the waste of resources due to unnecessary reservation holding.

However, this reliability issue is not assumed to be a serious problem, as the primary source of shadow ResvTear messages are reservation preemptions by a QM, which may not regularly be performed within a company network, or even at all. The secondary source of shadow ResvTear messages are reservation state timeouts, but these should hardly occur in a company network using suitably configured RSVP state refresh and timeout intervals. If preemption is regularly desired, a company may choose to deliver preemption requests via some reliable out-of-band mechanism (e.g., a mechanism also used to enable senders and receivers to agree on session identifications, which is anyway required for RSVP operation), and make the RSVP-Shadowing-enabled hosts responsible for safe teardown of preempted shadow reservations.

A.3. General Operation

The general operation of the invention will now be described with reference to FIG. 1. This general operation includes interoperation with legacy RSVP equipment along an E2E data path, typically due to domain connections managed by RSVP, which restricts the set of RSVP Shadowing enhancements applicable to such a scenario. Scenarios without legacy RSVP equipment will be discussed in later sections of this document.

A.3.1. Interoperation with Legacy RSVP

The following entities may use, for signaling and/or traffic scheduling purposes regarding an E2E data flow, legacy RSVP, or RSVP Shadowing that may partly use standard RSVP:

All hosts must use RSVP Shadowing. For general operation, this includes standard RSVP signaling for the E2E data flow. Additionally, it may include standard RSVP traffic scheduling for an outbound interface, including the connected link. The advantage of this approach is that a host can also easily use RSVP for the required per-flow traffic conditioning (see section "Background of the invention" above). For this approach, the E2E Adspec parameters of shadow Path messages must be filled out as described in section A.2.1. Alternatively, a host may use DiffServ traffic scheduling, provided that the per-flow traffic conditioning is performed in some way. For this approach, the E2E Adspec parameters of initial shadow Path messages can either be set arbitrarily, except for the inclusion of the service fragments corresponding to the supported services, and be ignored and replaced by the receiving local QM, or set to values that are neutral with regard to the respective parameter composition function. Such values are cleared break bits, an IntServ hop count of zero, a path bandwidth set to the maximum positive float value permitted, a path latency of zero, and a path MTU set to the maximum value permitted. If present, all GS error term parameters (Ctot, Dtot, Csum, Dsum) should be set to zero. Whereas some of these values are not compliant with standard RSVP, this is no problem as these parameters will only be processed by RSVP Shadowing stacks. In any case, a host must perform initial DSCP marking of the E2E data flow, according to the DCLASS object within the corresponding shadow Resv message sent by the local QM.

If domain-internal legacy routers (e.g., R2 or R4) are present, the local QM will typically disable their RSVP functionality (if provided at all), to ease configuration of the domain. It should be noted that this will typically lead to a set global RSVP break bit in the ADSPEC object of real E2E Path messages traversing such routers, although E2E QoS will anyway be provided via the DiffServ reservation(s) having been established for an E2E data flow. This is not assumed to be a problem, as it should be possible to configure the RSVP-Shadowing-enabled hosts within a company network with some a-priory knowledge of the domains to which RSVP Shadowing reservations can reliably be established, without relying on said break bit. If RSVP functionality cannot be disabled in domain-internal routers (quite unlikely), they will typically perform standard RSVP signaling, and standard RSVP scheduling for the outbound interface of an E2E data flow, including the connected link, like the hosts when not using DiffServ-style scheduling.

In case a domain connection is managed by RSVP, its legacy boundary routers as well as any present legacy intermediate router must use RSVP. Therefore, the RSVP functionality of BR1 and BR2 must be enabled, at least for interfaces outbound to the domain connection. However, RSVP functionality is typically not configurable per interface. Hence such BRs will typically perform standard RSVP signaling, and standard RSVP scheduling for the outbound interface of an E2E data flow, including the connected link, regardless of the interface the E2E data flow is forwarded to. For E2E data flows inbound from a domain connection or domain-local E2E data flows traversing a BR (e.g., a data flow from H2 to H4), such BRs consequently act like any legacy intra-domain router with enabled RSVP functionality. In case a domain connection is not managed by RSVP, the RSVP functionality of its legacy boundary routers and potential legacy intermediate routers should be disabled, with the same consequences as described for the domain-internal legacy routers above.

A general requirement for all legacy RSVP entities is that they must not change the DSCP marking of packets of E2E data flows traversing them, unless they have explicitly been configured to perform such re-marking, if possible.

For proper interoperation with RSVP-enabled entities, a QM must be aware of the kind of traffic scheduling performed for an E2E data flow on every individual link within that QM's domain, in each direction. If a particular link is managed via DiffServ and the shadow Path message corresponding to a particular E2E data flow passes admission control at the QM, the QM must appropriately configure a PHB or multiple PHBs along that link, according to the E2E parameters in that shadow Path message, or map that E2E data flow to one or many existent matching PHB(s). It must further synthesize the E2E Adspec parameters resulting from the use of this/those PHB(s) for the E2E data flow along that link, to compose them with the E2E Adspec parameters of other DiffServ-managed links along the E2E data path within said QM's domain, to build the E2E ADSPEC object of the shadow Resv message to be sent in response to that shadow Path message. Finally, it must adjust its internal representation of admitted data flows and used resources along that link according to the admitted E2E data flow, for future admission control. On the other hand, if a particular link is managed via legacy RSVP, the Adspec update will be performed when the real E2E Path message will be processed by the legacy RSVP entity responsible for that link, and admission control, traffic scheduling setup, and tracking of allocated resources will be performed when the corresponding real E2E Resv message will be processed by the same RSVP entity.

In case a domain connection is not managed by RSVP, the QM upstream of the domain connection is also responsible for admission control on behalf of the domain connection, and potentially for configuration of the domain connection, depending on the type of connection. A simple approach would be to logically include the domain connection, typically except for the boundary router downstream of the domain connection, into that QM's domain, and to manage the domain connection via DiffServ like the local domain. In this case, the QM would also be responsible for configuration of the connection and for synthesizing appropriate E2E Adspec parameters. This approach would, e.g., be suitable for a dark-fiber domain connection. For more complex domain connections (e.g., leased line, VPN tunnel), admission control would typically be performed by comparison of currently used resources with the total resources provided by the domain connection, the latter typically expressed via an SLA. There might even be different service classes provided by such a domain connection, also expressed by an SLA, with the QM being responsible to map its traffic to an appropriate service class, according to the QoS requested for an E2E data flow. Again, the QM must somehow know or gather appropriate Adspec parameters for the domain connection, for inclusion into its E2E Adspec update. Such parameters might also be part of an SLA, or be provided by the domain connection by other means out of scope of the invention.

A general requirement for a domain connection is that it must not change the DSCP marking of packets of E2E data flows traversing it, or must restore the inbound DSCP at the end of the domain connection, unless explicitly having been requested to perform DSCP re-marking (if possible), either by a QM or by means of an SLA.

A.3.2. Description of General Operation

The following description assumes that, with reference to FIG. 1, host H1 wants to set up an E2E reservation to host H6 by means of RSVP Shadowing, on behalf of a sending application running on H1 and a receiving application running on H6. The outbound interface and link of H1 are assumed to use RSVP scheduling for the E2E data flow. The domain connection is assumed to comprise BR1 and BR2 only, with both routers using legacy RSVP to manage the domain connection. Hence this is an example of general operation of the invention over two domains. The exchanged messages will not be discussed in full detail, please consult section A.2 for further information about message formats and contents.

Figure 8:
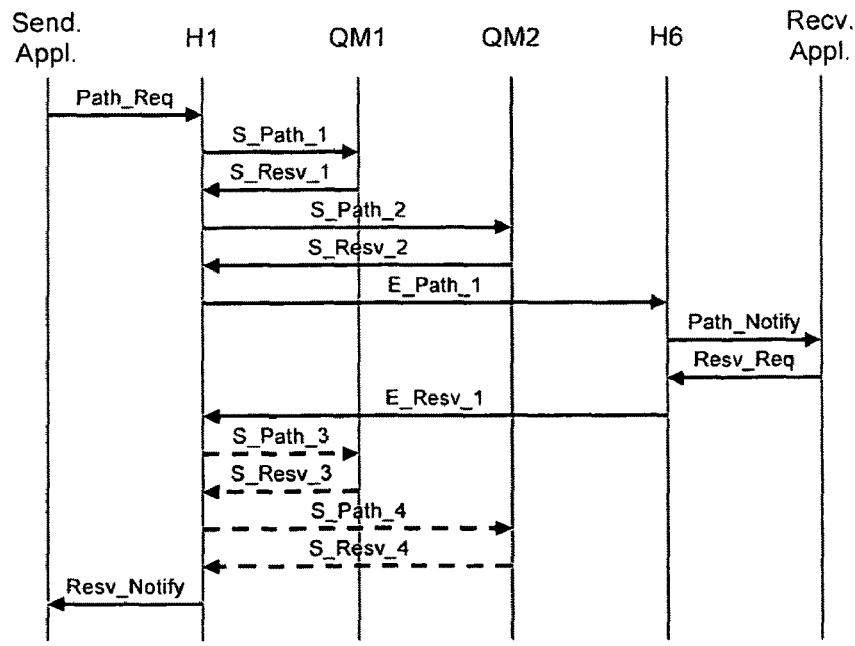
FIG. 8 a schematic representation of a signaling diagram.

Furthermore, the example describes a specific signaling model of the invention, which is called "sender model", reflecting that the RSVP Shadowing stack of the sending host initiates all shadow Path messages, to all affected QMs. Alternative signaling models will be discussed in later sections of this document. A signaling diagram of this example is shown in FIG. 8.

Firstly, H1 sends an initial shadow Path message (S_Path_1) to QM1, to request DiffServ-style reservation setup within DS domain 1. The shadow session identification contains QM1's address, the shadow protocol ID value of 253, and the shadow destination port value of 12345, the latter two being used within the whole company network. The shadow sender template comprises H1's address and a shadow source port value of 5000, the latter not currently being used by H1 for any other shadow reservation within QM1's shadow session. The E2E session identification comprises H6's address, and the protocol ID and destination port of the E2E data flow, e.g., UDP port 3000. The E2E sender template contains H1's address and the source port of the E2E data flow, e.g., 2000. The E2E sender Tspec indicates the properties of the E2E data flow, which need not be specified in detail here. The E2E Adspec is filled out according to section A.2.1, as necessary with RSVP scheduling of the E2E data flow at H1. For the sake of the discussion, it's assumed that both a GS and a CL service fragment are included in the E2E Adspec and that S_Path_i does not provide an E2E STYLE or FLOWSPEC object. Typically, most or all of the E2E-related parameters will be provided by the sending application on H1.

As there is only-the non-RSVP switch S1 on the path between H1 and QM1, S_Path_1 reaches QM1 without legacy RSVP processing. Because S_Path_1 is not a refresh message, QM1 must perform admission control for the E2E data flow specified by S_Path_1. Hence QM1 checks whether the E2E data flow is sustainable along its path through DS domain 1, given its Tspec and the provided Adspec. As H1 and the link from H1 to S1 will be managed by RSVP, QM1 only needs to check S1 and the link from S1 to BR1 for admission control. Because QM1 does not know which reservation style will be selected for the E2E data flow, it must assume the reservation style requiring the most resources, which is the FF style due to its distinct reservations per sender. As QM1 also does not know which service type will be selected for the E2E data flow, it must perform admission control for both the GS and the CL service, also taking any service-specific Adspec parameters into account. Therefore, admission control only succeeds if QM1 can provide a suitable PHB for both services, or a suitable PHB for each service, along the DiffServ-managed part of the E2E data path through DS domain 1, either by configuring such PHB(s) or by mapping of the E2E data flow to (an) existing matching PHB(s), with that PHB(s) having sufficient resources left to sustain the E2E data flow. Assuming that the admission control succeeds, QM1 will synthesize the Adspec parameters resulting from the use of the selected PHB(s) along the DiffServ-managed part of the E2E data path through DS domain 1, and adjust its internal data flow admission and resource usage representation according to the admitted E2E data flow.

Secondly, QM1 sends a shadow Resv message (S_Resv_1) corresponding to S_Path_1 back towards H1, to inform H1 about the admitted E2E reservation request and provide the related parameters. The shadow session identification is a copy from S_Path_1. Assuming that there are currently no other shadow reservations established at QM1, the shadow filter spec list will only contain a FILTER_SPEC object corresponding to the shadow sender template of S_Path_1. The shadow sender template is a copy of the shadow sender template of S_Path_1. The E2E DCLASS object lists two DSCPs, one for the GS and one for the CL service. These DSCPs may have the same value if QM1 uses the same PHB for both services. The E2E Adspec contains parameters composed from the initial parameters provided by S_Path_1 and the parameters synthesized by QM1 for the DiffServ-managed part of the E2E data path through DS domain 1. As there are no legacy RSVP routers along that path and S_Path_1 provides the parameters resulting from the RSVP scheduling at H1, this E2E Adspec indicates the properties of the full E2E path from H1 to BR1, including the properties of all network equipment along that path, except BR1.

Because there is only the non-RSVP switch S1 on the path between QM1 and H1, S_Resv_1 reaches H1 without legacy RSVP processing. H1 checks the included session identification and shadow sender template to check whether S_Resv_1 is related to one of its shadow reservations. As this is the case and S_Resv_1 is not a refresh message, its reception indicates H1 that the reservation request for the corresponding E2E data flow has been admitted for the DiffServ-managed part of DS domain 1. Hence H1 stores the E2E DCLASS object of S_Resv_1 for later DSCP marking, and extracts S_Resv_1's E2E ADSPEC object.

Thirdly, H1 sends an initial shadow Path message (S_Path_2) to QM2, to request DiffServ-style reservation setup within DS domain 2. The shadow session identification contains QM2's address, the shadow protocol ID value of 253, and the shadow destination port value of 12345. The shadow sender template comprises H1's address and a shadow source port value of 5001, the latter not currently being used by H1 for any other shadow reservation within QM2's shadow session. As sender templates are defined per session, H1 may also choose to reuse the shadow source port value of 5000 from S_Path_1, so the value 5001 is merely selected for the sake of the discussion. The E2E-related parameters are the same as in S_Path_1, except for the E2E ADSPEC object, which is simply a copy of the E2E ADSPEC object of S_Resv_1 to enable further composition of E2E Adspec parameters along the E2E data path.

In addition to the non-RSVP switches S1 and S3, S_Path_2 traverses the legacy RSVP routers BR1 and BR2, which process it according to standard RSVP. However, the RSVP Shadowing extension object is not processed by these routers, but simply forwarded unchanged. Assuming that S_Path_2 is not rejected by BR1 or BR2, the message will reach QM2. As S_Path_2 is not a refresh message, QM2 performs admission control checking and potential DiffServ-style configuration, like QM1 did for S_Path_1. For DS domain 2, the RSVP-managed part the E2E data path consist of BR2 and the link from BR2 to S3, and the DiffServ-managed part comprises S3 and the link from S3 to H6. Assuming that the admission control succeeds, QM2 will synthesize the Adspec parameters resulting from the use of the selected PHB(s) along the DiffServ-managed part of the E2E data path through DS domain 2, and adjust its internal data flow admission and resource usage representation according to the admitted E2E data flow.

Fourthly, QM2 sends a shadow Resv message (S_Resv_2) corresponding to S_Path_2 back towards H1, to inform H1 about the admitted E2E reservation request and provide the related parameters. The shadow session identification is a copy from S_Path_2. Assuming that there are currently no other shadow reservations established at QM2, the shadow filter spec list will only contain a FILTER_SPEC object corresponding to the shadow sender template of S_Path_2. The shadow sender template is a copy of the shadow sender template of S_Path_2. The E2E DCLASS object lists two DSCPs, one for the GS and one for the CL service. These DSCPs may have the same value if QM2 uses the same PHB for both services. Depending on the existence and contents of a traffic conditioning agreement (TCA) between DS domain 1 and DS domain 2, these DSCPs may or may not be the same as indicated by S_Resv_1. The E2E Adspec contains parameters composed from the parameters provided by S-Path_2 and the parameters synthesized by QM2 for the DiffServ-managed part of the E2E data path through DS domain 2. This E2E Adspec does not indicate the properties of the full E2E path from H1 to the H6, including the properties of all network equipment along that path, except H6, as S_Path_2 did not include E2E Adspec parameters for the domain connection and the parameters synthesized by QM2 do not include BR2 and the link from BR2 to S3.

In addition to the non-RSVP switches S1 and S3, S_Resv_2 traverses the legacy RSVP routers BR1 and BR2, which process it according to standard RSVP. However, the RSVP Shadowing extension object is not processed by these routers, but simply forwarded unchanged. Assuming that S_Resv_2 is not rejected by BR1 or BR2, the message will reach H1. H1 checks the included session identification and shadow sender template to check whether S_Resv_2 is related to one of its shadow reservations. As this is the case and S_Resv-2 is not a refresh message, its reception indicates H1 that the reservation request for the corresponding E2E data flow has been admitted for the DiffServ-managed part of DS domain 2. Hence H1 extracts S_Resv_2's E2E ADSPEC object, but can safely ignore S_Resv_2's E2E DCLASS object, because DS domain 2 is not H1's local domain.

Fifthly, H1 sends an initial, real E2E Path message (E Path_1) to H6, without RSVP Shadowing extensions, to prepare RSVP-style reservation setup along the parts of the E2E data path managed by legacy RSVP. The session identification comprises H6's address, and the protocol ID and destination port of the E2E data flow, i.e., UDP port 3000. The sender template contains H1's address and the source port of the E2E data flow, i.e., 2000. The E2E sender Tspec indicates the properties of the E2E data flow. Hence these parameters are the same as the respective E2E parameters in S_Path_1 and S_Path_2. The ADSPEC object is simply a copy of the E2E ADSPEC object of S_Resv_2 to enable further composition of E2E Adspec parameters along the E2E data path.

In addition to the non-RSVP switches S1 and S3, E_Path_1 traverses the legacy RSVP routers BR1 and BR2, which process it according to standard RSVP. This results in the Adspec parameters of BR1 and BR2 being composed into the ADSPEC object, including the parameters of their respective downstream link, finally building an Adspec indicating the properties of the full E2E path from H1 to H6, including the properties of all network equipment along that path, except H6. Assuming that E_Path_1 is not rejected by BR1 or BR2, the message will reach H6. The receiving application on H6 can now select, as usual for RSVP, the parameters to be used for the E2E reservation of the E2E data flow, i.e., the reservation style, the service type, the reservation Tspec parameters, and potentially the Rspec parameters, according to the Adspec parameters provided by E_Path_1. The only exception is the Slack Term parameter of the GS Rspec, which is currently not supported for general operation of the invention (see below) and must therefore always be set to zero (by the receiving application or by the RSVP Shadowing stack of H6) for general operation of the invention.

Sixthly, H6 sends a real E2E Resv message (E_Resv_) corresponding to E_Path_1 back towards H1, to set up the E2E reservation along the parts of the E2E data path managed via legacy RSVP, and to inform H1 about the parameters of the E2E reservation. The session indication is a copy from E_Path_1. The contents of the STYLE, FLOWSPEC and FILTER_SPEC objects depend on the parameters selected at H6, as usual for RSVP.

In addition to the non-RSVP switches S1 and S3, E_Resv_1 traverses the legacy RSVP routers BR1 and BR2, which process it according to standard RSVP. This results in the E2E reservation being established at BR1 and BR2, including their respective downstream link. Assuming that the E_Resv_1 is not rejected by one of these routers, it will reach H1, which will finally set up the E2E reservation at H1 and along the link from H1 to S1, if possible. With this step, the E2E reservation for the E2E data flow is in principle established.

However, the general operation of the invention has one principal shortcoming with regard to the standard RSVP reservation concept: RSVP reservations are receiver-initiated, i.e., the receiver selects which service type, reservation style and reservation parameters are to be used, whereas general operation of RSVP Shadowing is sender-initiated, as the shadow communication already establishes shadow reservations within affected DS domains, typically before the E2E reservation parameters are known. This is a result of the coupling of the collection of E2E Adspec parameters for the RSVP-Shadowing-managed part of an E2E data path, which are needed to build a real E2E Path message, with the shadow reservation setup. An alternative approach would be to generally use a two-phase RSVP Shadowing communication, with the first phase collecting Adspec parameters and the second phase setting up shadow reservations after the real E2E RSVP communication, according to the now know E2E reservation parameters, but this approach has not been chosen for the invention, for reasons discussed below.

Due to the said shortcoming, shadow reservations may not match a corresponding E2E reservation. If so, the shadow reservations will be over-provisioned in the most cases, e.g., due to shadow reservations for multiple services from which only one can be used for the E2E reservation, the use of a shared E2E reservation style whereas the shadow reservations assumed distinct style, or E2E flowspec parameters having been selected somehow "smaller" than indicated by the corresponding E2E Tspec. However, the shadow reservation might be under-provisioned in some cases, with the most probable examples being a GS reservation using a service rate (R) higher that the token bucket rate (r) of the corresponding E2E Tspec, or using a minimum policed unit (m) value smaller than indicated by the corresponding E2E Tspec. It should be noted that, due to flowspec merging, the E2E flowspec parameters provided to a host on which multiple senders are associated with one E2E session using a shared reservation style may look like being somehow "bigger" than indicated by the respective E2E Tspec parameters of some senders. For example, if a sender 1 sends an 1 Mbps data flow and a sender 2 sends a 2 Mbps data flow, a receiver will typically try to reserve 2 Mbps, hence the corresponding flowspec will look like being to big for sender 1. However, the RSVP Shadowing stack of that host can easily detect, from its internal state, that sender 2 is the cause of that flowspec and adjustment of the shadow reservation for sender is not required.

The invention handles mismatches between shadow reservations and a corresponding E2E reservation through adjustment of the shadow reservations. These adjustments are performed via updated shadow Path messages sent to the affected QMs, with these messages containing the E2E reservation parameters received for the E2E reservation, as described in section A.2.1. In case of under-provisioned shadow reservations, this adjustment is naturally required. Furthermore, due to the increase of requested resources, it may result in admission control failure, in which case the corresponding E2E reservation must be torn down. In case of over-provisioned shadow reservations, the initiator of the shadow reservations may or may not adjust these reservations, according to the potentially wasted resources, company-specific policies, and the recommendation given below. If performed, this kind of adjustment should not lead to admission control failures, as already established reservations are merely reduced, or even removed completely. By the way, this adjustment mechanism is the reason why a non-zero GS Slack Term parameter (S) value is currently not supported for general operation of the invention, as such value may lead to a reduction of the GS service rate parameter (R) along the path of an E2E Resv message, whereas the adjustment mechanism requires an unchanged R for proper operation.

To continue the example discussion, it's assumed that E_Resv_1 indicates an FF-style reservation for the CL service, with the flowspec parameters exactly matching the respective parameters of E_Path_1. Hence the assumption of FF reservation style was correct, and there is no waste of resources due to a "smaller" flowspec. If S_Resv_1 indicated different DSCPs for GS and CL service, the CL shadow reservations would be fine, but the GS shadow reservations would typically be wasted completely. Even if S_Resv_1 indicated the same DSCP for GS and CL service, there might be resources allocated to support GS that are not strictly needed for CL, e.g., enlarged buffers to ensure the no-loss guarantee of GS. For these reasons, it's assumed that H1 chooses to adjust the shadow reservations to get rid of the (potentially) wasted GS shadow reservations.

Seventhly, H1 sends an updated shadow Path message (S_Path_3) to QM1, to request adjustment of the DiffServ-style reservation within DS domain 1. This message is a copy of S_Path_1, except for the changed E2E ADSPEC object and the added E2E STYLE and FLOWSPEC objects, the latter two being copies of the respective objects of E_Resv_1. The E2E Adspec must contain the same CL-related parameters as in S_Path_1, but may use another distribution into general and service-specific parameters due to the removed GS service fragment.

On reception of S_Path_3, QM1 detects that the message corresponds to an established shadow reservation, and compares S_Path_3 with the associated path and reservation state. Checking the E2E STYLE and FLOWSPEC objects of S_Path_3, QM1 detects that the CL reservation within DS domain 1 doesn't need to be changed, but that the GS reservation should be removed. Hence QM1 reclaims the GS-related resources and removes all GS-related information from its internal data flow admission and resource usage representation. If beneficial in terms of configuration complexity, resource usage, or similar, QM1 may also choose the change the CL reservation, including an update of its internal data flow admission and resource usage representation, provided that this change does not result in somehow "worse" E2E Adspec parameters than reported by S_Resv_1, to avoid any need for adjustment of the E2E reservation, which might in turn require another shadow reservation adjustment, etc. In case the CL reservation is changed, QM1 will synthesize the resulting E2E Adspec parameters as usual. In any case, QM1 stores the information from the E2E STYLE and FLOWSPEC objects, for future admission control and configuration.

Eighthly, QM1 sends an updated shadow Resv message (S_Resv_3) corresponding to S_Path_3 back towards H1, to inform H1 about the successful adjustment of the shadow reservation and provide the related parameters. The shadow session identification is a copy from S_Path_3. Assuming that there are still no other shadow reservations established at QM1, the shadow filter spec list will only contain a FILTER_SPEC object corresponding to the shadow sender template of S_Path_3. The shadow sender template is a copy of the shadow sender template of S_Path_3. The E2E DCLASS object only lists the DSCP for the CL service. If QM1 has changed the CL reservation, this DSCP may have a different value compared to the CL service's DSCP contained in S_Resv_1. The E2E Adspec only contains CL-related parameters, either the same ones as in S_Resv_1 or new ones corresponding to the changed CL reservation, but may use another distribution into general and service-specific parameters due to the removed GS service fragment. As the E2E DCLASS and ADSPEC objects differ from S_Resv_1 (and its potential refreshes), QM1 need not toggle the presence of the NULL object (see section A.2.2).

On reception of S_Resv_3, H1 detects that the message confirms the shadow reservation adjustment requested by S_Path_3. Hence H1 stores the E2E DCLASS object of S_Resv_3 for later DSCP marking, and extracts S_Resv_3's E2E ADSPEC object.

Ninthly, H1 sends an updated shadow Path message (S_Path_4) to QM2, to request adjustment of the DiffServ-style reservation within DS domain 2. This message is a copy of S_Path_2, except for the E2E ADSPEC object, which is simply a copy of the E2E ADSPEC object of S_Resv_3, and the added E2E STYLE and FLOWSPEC objects, which are copies of the respective objects of S_Path_3.

Assuming that S_Path_4 successfully traverses the legacy RSVP routers BR1 and BR2, the message will reach QM2. QM2 processes S_Path_4 like QM1 did with S_Path_3, resulting in removal of the GS reservation and potential change of the CL reservation, within DS domain 2. In case the CL reservation is changed, QM2 will synthesize the resulting E2E Adspec parameters as usual. In any case, QM2 stores the information from the E2E STYLE and FLOWSPEC objects, for future admission control and configuration.

Tenthly, QM2 sends an updated shadow Resv message (S_Resv_4) corresponding to S_Path_4 back towards H1, to inform H1 about the successful adjustment of the shadow reservation and provide the related parameters. The shadow session identification is a copy from S_Path_4. Assuming that there are still no other shadow reservations established at QM2, the shadow filter spec list will only contain a FILTER_SPEC object corresponding to the shadow sender template of S_Path_4. The shadow sender template is a copy of the shadow sender template of S_Path_4. The E2E DCLASS object only lists the DSCP for the CL service. If QM2 has changed the CL reservation, this DSCP may have a different value compared to the CL service's DSCP contained in S_Resv_2. As usual, the E2E Adspec comprises parameters composed from the parameters provided by S_Path_4 and the parameters synthesized by QM2 for DS domain 2, with the latter maybe having different values compared to step 4 if the CL reservation has been changed. As the E2E DCLASS and ADSPEC objects differ from S_Resv_2 (and its potential refreshes), QM2 need not toggle the presence of the NULL object (see section A.2.2).

Assuming that S_Resv_4 successfully traverses the legacy RSVP routers BR1 and BR2, the message will reach H1. H1 detects that the message confirms the shadow reservation adjustment requested by S_Path_4. However, H1 doesn't need to extract S_Resv_4's E2E DCLASS and ADSPEC objects, as DS domain 2 is not H1's local domain and the Adspec is not processed any further.

With the successful adjustment of the shadow reservations, the E2E reservation for the E2E data flow is finally established, as the legacy RSVP reservations are already in place and the invention does generally not adjust these according to the potentially changed E2E Adspec parameters of the adjusted shadow reservations, to avoid potential adjustment looping as described above. Therefore, the sending application on H1 can now be notified about the reservation and its parameters, enabling it to start sending of the E2E data flow.

Naturally, all the complex signaling described above is transparently handled by the RSVP Shadowing stacks on behalf of the sending and receiving application, enabling them to use a simple RSVP-style API as with legacy RSVP. The sending application only needs to request sending of an E2E Path message, typically providing most or all of the E2E-related parameters, which in turn are reflected in the E2E parameters of the first initial shadow Path message. The receiving application is notified about the received E2E Path message, selects the parameters to be used for the E2E Resv message, and requests sending of this message, as usual for RSVP. Finally, the sending application is notified about the completed reservation and its parameters, as usual for RSVP. FIG. 8 shows a signaling diagram of the sender-model reservation setup discussed above, including requests from and notifications to the sending/receiving application. As the shadow messages used for adjustment of the shadow reservations are in principle optional, they are shown with dashed arrows.

The adjustment of shadow reservations adds a significant overhead to the signaling of the invention. Therefore, it should be avoided as far as possible, and the benefits of an adjustment should be weighted up against this overhead. A suitable approach to avoid adjustments is to provide within an initial shadow Path message as much as possible information about the parameters that will be selected for an E2E reservation to be established (see section A.2.1), and to restrict the parameter selection behavior of the receiving application, as follows:

- If the service type of the E2E reservation is know beforehand, the E2E Adspec of the initial shadow Path message should only contain a service fragment corresponding to that service, to avoid shadow reservation setup for anyway unused services.
- If the whole flowspec parameters of the E2E reservation, i.e., the service type, the Tspec parameters, and potentially the Rspec parameters, are know in advance, the initial shadow Path message should comprise a corresponding E2E FLOWSPEC object.
- If the reservation style of the E2E reservation is know beforehand, the initial shadow Path message should comprise a corresponding E2E STYLE object.
- The receiving application should select its reservation parameters according to the corresponding parameters in an E2E Path message if feasible. For example, the application should not arbitrarily select, in comparison with that Path message's TSPEC or FLOWSPEC objects, somehow "smaller" flowspec parameters, a GS service rate (R) differing from the token bucket rate (r), or a smaller minimum policed unit (m), if the application can accept the proposed parameters.
- If there anyway is some out-of-band mechanism for communication between the sending and the receiving application (e.g., for device and/or service discovery purposes), this mechanism might also be used to gather information about the reservation parameters that will be selected by the receiver, and to provide this information to the sender for inclusion in the initial shadow Path message as described above.

Given the use of the invention within a well-known company network and with a limited set of applications using RSVP-Shadowing-enabled reservations, it's assumed that it will quite often be possible to achieve a-priory knowledge of the service type and reservation style of an E2E reservation. For the CL service, even the full flowspec parameters might be known in advance. On the other hand, it will typically be harder to know GS flowspec parameters beforehand, even if the delay constraints of the receiver are well-understood, as this will typically require some knowledge of the composed E2E Adspec parameters of the whole E2E data path, including the part managed by legacy RSVP.

As described above, under-provisioned shadow reservations must be adjusted. However, the initiator of an over-provisioned shadow reservation may or may not adjust the reservation, according to the potentially wasted resources and company-specific policies. The following list reflects some considerations whether or not to adjust an over-provisioned shadow reservation:

- If a company network is generally over-provisioned with regard to the requirements of shadow reservations, over-provisioned shadow reservation may never be adjusted, especially if fast establishment of reservations is preferred over effective resource utilization.
- If the usage time of a shadow reservation is short in comparison with its setup time, reservation adjustment may not be useful.
- If the potentially wasted resources are negligible compared to the resources actually used for a shadow reservation, reservation adjustment might not be performed.
- The greater the amount of the potentially wasted resources is in comparison with the capacity of the affected network equipment and links, the more it's useful to perform reservation adjustment.
- The longer the usage time of a shadow reservation potentially wasting resources is, the more it's useful to perform reservation adjustment.
- If a shared reservation style is used for an E2E reservation, but the corresponding shadow reservation assumed FF style, it will typically be beneficial to adjust the shadow reservation, unless the expected number of senders along the shared part of the E2E data path(s) is very low or that/those shared path(s) are very short. Naturally, these evaluations must also reflect the size of the reservation with respect to the capacity of said path(s), and potentially the reservation duration.
- If shadow reservations for multiple service types have been set up for a particular E2E session, reservation adjustment will often allow reclaiming of the complete resources allocated to unused services, making it quite recommendable, unless the resources allocated to unused services are strictly a subset of the resources allocated to the actually used service.

A.3.3. Issues and Restrictions of General Operation

All issues with general operation of the invention are related to the GS service, which is not surprising given its more demanding constraints and more complex setup procedure compared to the CL service.

The first issue, already discussed in section A.3.2, is the restriction of the GS Slack Term parameter (S) to zero, to avoid adjustment of the GS service rate parameter (R) by legacy RSVP equipment, which in turn would prevent proper adjustment of shadow reservations. However, this issue is not assumed to be a serious problem as it's well possible to set up reservations for GS service without using slack.

Figures 9, 10:
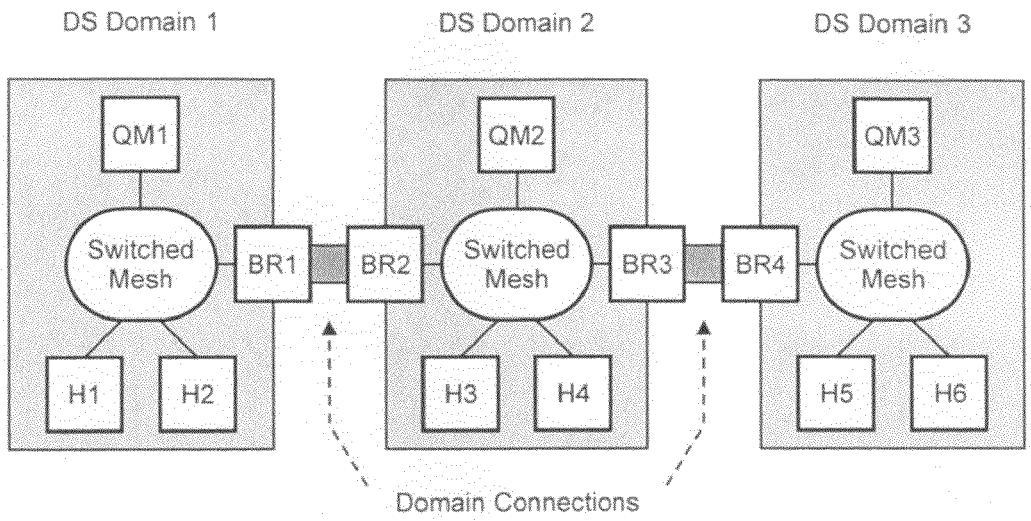
FIG. 9 a schematic representation of a scenario with multiple domains.
FIG. 10 a schematic representation of format of a GS service fragment for QM-controlled reshaping (sender model), FIG. 11 a schematic representation of a QM-controlled reshaping example, FIG. 12 a schematic representation of a signaling diagram of a QM-controlled reshaping example, FIG. 13 a schematic representation of a signaling diagram (hop model), FIG. 14 a schematic representation of a signaling diagram of a QM-controlled reshaping example (hop model) and FIG. 15 a schematic representation of a signaling diagram for a logical E2E model.

A more serious issue is the assembly of the E2E Adspec parameters, which is performed out of order with regard to standard RSVP, as the parameters corresponding to the RSVP-Shadowing-managed part of an E2E data path are composed first, disregarding the parameters corresponding to the part of that E2E data path managed by legacy RSVP, and these RSVP-Shadowing-related parameters are the starting point for assembly of the legacy-RSVP-related parameters later. This will often lead to E2E Adspec parameters provided to a QM by a shadow Path message not yet including legacy-RSVP-related parameters, and to Adspec parameters provided to legacy RSVP equipment by E2E Path messages already including RSVP-Shadowing-related parameters corresponding to downstream parts of an E2E data path. For example, a scenario with multiple domains as shown in FIG. 9 is considered, with all domain connections managed by legacy RSVP.

In this example, the shadow Path message sent to QM2 lacks Adspec information about the domain connection between BR1 and BR2, and the shadow Path message sent to QM3 even lacks Adspec information about both domain connections. On the other hand, the E2E Path message received by BR1 already includes Adspec information about the downstream DS domains 2 and 3, and the E2E path message received by BR3 already includes Adspec information about the downstream DS domain 3.

For most Adspec parameters, namely the ones expressing properties of the whole E2E data path and to be evaluated by the receiver of an E2E Path message only, the sequence of parameter composition is irrelevant. However, the GS error term parameters are intended for evaluation by intermediate RSVP routers. The GS total error term parameters (Ctot, Dtot) are evaluated in case of Slack Term utilization. As the general operation of the invention does anyway not support non-zero Slack Term (S) values, this is no problem.

However, the GS sum error term parameters (Csum, Dsum) are evaluated for buffer setup in RSVP routers and should similarly be evaluated by QMs for buffer setup within their respective DS domains, to achieve the no-loss guarantee of the GS service. In case of lacking legacy-RSVP-related parameters, a QM cannot simply rely on the GS sum error term parameters of a provided E2E Adspec, but must somehow have additional information about the worst-case processing/queuing delay of all upstream parts of the E2E data path managed by legacy RSVP. This information may apply to a specific E2E data flow for which a reservation is to be established, to classes of data flows defined for a company network, with each class expressed by sets and/or ranges of E2E Tspec parameters, or even only to the maximum E2E Tspec admissible for GS service within a company network. How this information is gathered and provided to the QMs is out of scope of the invention.

Furthermore, reshaping of an E2E data flow by legacy RSVP equipment must be avoided, as this would lead to GS sum parameters being reset to values only reflecting the reshaping router and the downstream link, eliminating the composed RSVP-Shadowing-related parameters of an E2E data path. In the example described above, with BR2 performing legacy reshaping, the GS sum parameters set by BR2 would reach BR3 unchanged, and BR3 would set up its buffers accordingly. Unfortunately, those GS sum parameters would no longer reflect the RSVP-Shadowing-related processing/queuing delay of DS domain 2 (in fact, they would not reflect any DS domain), typically causing BR3's buffers being insufficient to achieve the no-loss guarantee of the GS service. Reshaping of E2E data flows using GS service is required at heterogeneous multicast branch points. As the invention is not designed for multicast operation, this is no problem. However, such reshaping is also required at data flow merge points using shared reservations. Consequently, for general operation of the invention, the use of GS service must be restricted to FF-style reservations.

A.4. Enhancements of General Operation

This section describes enhancements of the invention applicable to the general operation of the invention.

A.4.1. Next Shadow Hop Information

The use of sender-model signaling requires that every host's RSVP Shadowing stack knows the shadow session identification of all QMs within a company network (e.g., via configuration). For a small network as shown in FIG. 1, this does not seem to be a problem, but for company networks consisting of many DS domains, provisioning of all shadow session identifications to all hosts may represent an undesired management burden. The invention addresses this issue by including in shadow Resv messages information about the next shadow hop to be contacted, if applicable. With this enhancement, each host only needs to know the shadow session identification of its local domain's QM, while information about the shadow session identification of remote QMs is maintained at the local QM, with that information only required for QMs of directly adjacent domains.

To represent next shadow hop information, the invention uses an optional SESSION sub-object within the RSVP Shadowing extension object of shadow Resv messages, with that object comprising the next shadow hop's shadow session identification, i.e., the IP address, the experimental protocol ID, and the shadow destination port used for that hop. The flag field is currently not used by the invention.

If this enhancement were used for the example described in section A.3.2, QM1 would include such a SESSION object in the messages S_Resv_1 and S_Resv_3, with the object containing QM2's address, the shadow protocol ID value of 253, and the shadow destination port value of 12345. Hence H1 could simply use this object as shadow SESSION object of the messages S_Path_2 and S_Path_4. However, QM2 would not include next shadow hop information in S_Resv_2 and S_Resv_4, as QM2 would be the last shadow hop to be contacted by H1.

A.4.2. Dynamic Downstream DSCP Re-Marking

With standard sender-model signaling, a QM is not informed about the DSCP(s) selected by QMs of adjacent DS domains, for the E2E data flow for which an E2E reservation is to be established. Consequently, a company network must statically be configured to provide consistent PHBs within all of its DS domains, to be able to map an E2E data flow crossing multiple domains to the respective domain's PHB appropriate for the QoS desired for the E2E data flow. If such consistent PHBs are to be selected by different DSCPs in adjacent DS domains, there must be a static DSCP re-marking agreement between such domains. However, such static configuration may not be sufficient for some applications, or a company may want more dynamic PHB configurations and DSCP mappings to achieve better network resource utilization. For example, an E2E data flow may dynamically be mapped to different PHBs, or differently provisioned instances of a PHB, within different DS domains of a company network, according to the current load of such PHBs, in which case there cannot be a static 1:1 mapping of the DSCPs of adjacent domains.

The invention addresses this issue by including in shadow Path messages information about the DSCP(s) that will be used within an upstream DS domain, for the E2E data flow for which an E2E reservation is to be established. This enables the QM of the downstream DS domain to set up dynamic DSCP re-marking for packets inbound from the upstream domain and marked with the DSCP indicated by the shadow Path message, to the DSCP that will be used for the E2E data flow within the downstream domain.

To represent upstream DSCP information, the invention uses an optional DCLASS sub-object within the RSVP Shadowing extension object of shadow Path messages sent to QMs of remote DS domains. This DCLASS object is a copy of the E2E DCLASS object received in the shadow Resv message sent by the QM of the domain upstream of the domain to which the shadow Path message is sent. Consequently, for operation over multiple domains, the E2E DCLASS object of shadow Resv messages from remote domains is no longer ignored as without this enhancement, but extracted to be placed into the next shadow Path message to be sent, except for the shadow Resv message from the last QM to be contacted for setup of the shadow reservations.

If this enhancement were used for setup of an RSVP Shadowing reservation in the multiple-domain scenario shown in FIG. 9, with the reservation to be established from H1 to H6, the initial shadow Path message to the local QM, QM1, would not contain upstream DSCP information as there is no upstream domain. QM1 would indicate in the E2E DCLASS object of the corresponding shadow Resv message the DSCP(s) selected for DS domain 1, and H1 would store this information for later DSCP marking, as usual for the invention. However, H1 would also copy that DCLASS object into the shadow Path message sent to QM2, reporting QM1's DSCP mapping to QM2 for setup of downstream DSCP re-marking.

QM2 would report its DSCP selection within its shadow Resv message sent back towards H1, as usual for the invention, but H1 would no longer ignore this information, but copy it into the shadow Path message sent to QM3, to report QM2's DSCP selection to QM3. As QM3 would be the last shadow hop to be contacted by H1, the DSCP information contained in the shadow Resv message sent by QM3 could safely be ignored by H1.

A.4.3. QM-controlled Reshaping for Guaranteed Service

As described in section A.3.3, the GS sum error term parameters to be placed into the ADSPEC object of an initial E2E Path message must in principle reflect the whole RSVP-Shadowing-managed part of an E2E data path, to ensure proper buffer setup even in a legacy RSVP router placed near the receiver of the corresponding E2E data flow, or within a receiver itself if the RSVP Shadowing stack or receiving application tailors its buffering according to these parameters. However, this will typically lead to buffer setups in legacy RSVP equipment exceeding the actually required buffer sizes; the nearer to a sender such equipment is placed the more excess buffering will be set up. Whether or not this is a problem within a particular company network depends on the network's processing/queuing delay, the properties of the data flows using RSVP Shadowing, and the buffer capacity of affected legacy RSVP equipment.

If such waste of buffer space is assumed to be a problem, QMs may set up per-flow reshaping of E2E data flows using GS service. This reshaping might be performed within legacy RSVP equipment (which must anyway be capable of such reshaping), but only if a QM can configure the equipment to perform reshaping but nevertheless update the corresponding GS sum parameters as if no reshaping had been done, to avoid the "parameter reset" problem described in section A.3.3. However, such configurability is assumed to be rarely provided by legacy RSVP equipment. Therefore, the general solution of the invention to this problem is to use generic equipment capable of multi-field (MF) classification and per-flow reshaping. This equipment should be placed at suitable points of a DS domain's topology, e.g., between boundary routers and the rest of the domain, and controlled by the domain's QM according the information provided by RSVP Shadowing messages.

With sender-model signaling, a QM using QM-controlled reshaping within its domain must be able to report in its shadow Resv messages two sets of GS sum parameters back to the host that requested the corresponding shadow reservation. The first set indicates the properties of the E2E data path from the last reshaping point within that QM's domain to the domain boundary, or to the receiver. The second set indicates the properties of the E2E data path from the sender, or from the last reshaping point upstream of that QM's domain (if present), to the last reshaping point within that QM's domain, with intermediate reshaping points (if present) within that QM's domain taken into account. For each section between the sender and an adjacent reshaping point within that QM's domain, or between two adjacent reshaping points, along said part of the E2E data path, the composed GS sum parameters are evaluated, and the maximum value for each parameter from any of those sections is placed into the second parameter set. Consequently, the Csum and Dsum parameters of this set may correspond to different sections of said part of the E2E data path, with these sections providing the worst-case service with regard to the respective parameter.

To carry the additional set of GS sum parameters, the invention extends the parameter set of the GS service fragment of the E2E ADSPEC sub-object within the RSVP Shadowing extension object of a shadow Resv message sent by a QM that has configured QM-controlled reshaping within its DS domain. FIG. 10 shows the format of that service fragment. The RSVP Shadowing extensions are highlighted through gray shading, and optional message components are shown with dashed borders.

The first set of GS sum parameters, i.e., the standard since-parameters, is copied into further shadow Path messages (if present) to enable further composition of DiffServ-related E2E Adspec parameters, as usual for the invention. The second set, i.e., the RSVP-Shadowing-specific between-parameters, is extracted by the initiating host for computation of the GS sum parameters to be placed into the initial E2E Path message later.

Once the initial RSVP Shadowing communication is complete, the initiating host computes the maximum of all reported between-parameters and the since-parameter of the last shadow Resv message, for Csum and Dsum, respectively. The resulting values are used for the initial E2E Path message, whereas the GS total parameters and any service-specific general parameters are processed as usual for the invention.

Figure 11:
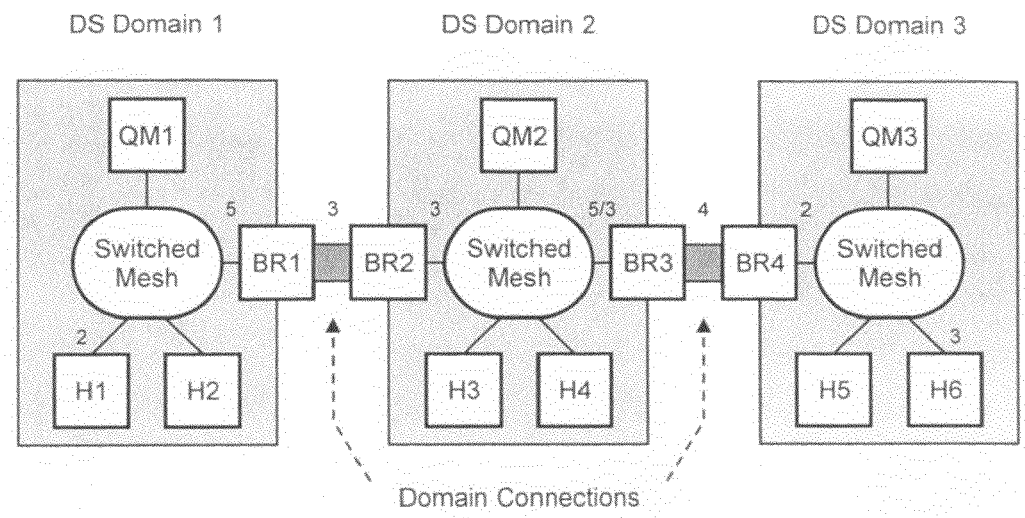

FIG. 11 shows an example of QM-controlled reshaping for GS Service, for the same scenario as discussed in section A.3.3 (3 domains, domain connections managed by legacy RSVP). The numbers indicate the processing/queuing delay expressed by a particular GS sum parameter (e.g., Dsum), in time units, for a particular E2E data flow from H1 to H6. Every value applies to the neighboring link, including the upstream node/mesh. QM2 is assumed to have set up reshaping within the switched mesh of DS domain 2, resulting in a sum parameter value of 5 for the part of the mesh upstream of the reshaping point, and a sum parameter value of 3 for the part of the mesh downstream of the reshaping point.

Figure 12:
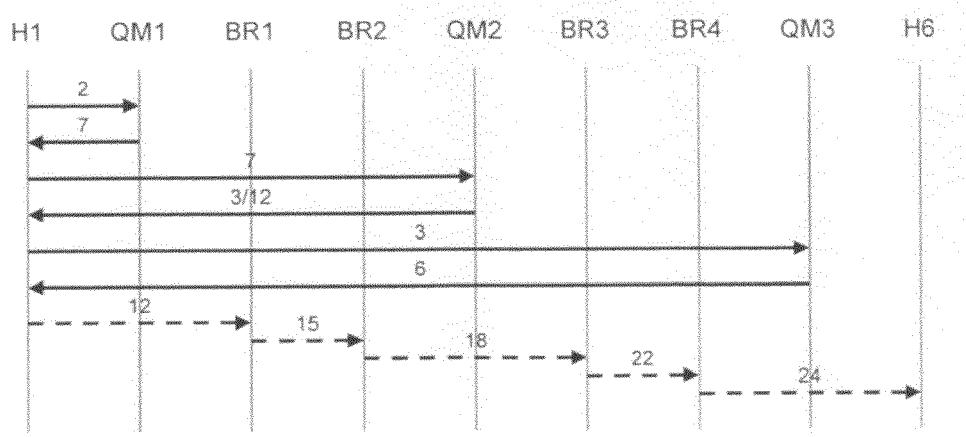

FIG. 12 shows a signaling diagram corresponding to the example. Continuous arrows from left to right indicate shadow Path messages, continuous arrows from right to left indicate shadow Resv messages, and dashed arrows indicate the E2E Path message, divided into fragments per RSVP hop to highlight the E2E Adspec update along the E2E data path. The numbers reflect the value of the said sum parameter in each message, with the shadow Resv message sent by QM2 comprising to values, the first corresponding to the since-parameter and the second corresponding to the between-parameter, as in the E2E ADSPEC object of this message.

Up to the reshaping point in DS domain 2, the composition of the sum parameter value is 12, but from the reshaping point to BR3, the composition results in a value of 3. Hence H1 stores the between-value 12, but sends the initial shadow Path message to QM3 with a since-value of 3. The corresponding shadow Resv message sent by QM3, which is the last shadow Resv message, reports a since-value of 6, which is smaller than the previously stored between-value. Therefore, H1 sends the initial E2E Path message with a since-value of 12. This value is updated at each legacy RSVP hop as usual.

If QM2 had not configured reshaping, the sum parameter value used for the initial E2E Path message would have been 18 instead of 12, leading to 50 percent more buffer space being set up by BR1. The other legacy RSVP routers would also have set up more buffer space than with reshaping, but the waste would relatively be the smaller the more downstream along the E2E data path such a router is located. With more DS domains performing reshaping, the difference in buffer sizes may even be greater.

A.4.4. Hop-Model Signaling

The sender-model signaling of the invention described so far has some shortcomings with regard to large networks with multiple domains, as many QMs may have to be contacted for setup of an E2E reservation using RSVP Shadowing, which in turn requires an initiating host to associate an equivalent number of shadow reservations with an E2E reservation. Furthermore, the more QMs must be contacted the more shadow sessions must be managed by legacy RSVP equipment along the E2E data path. For example, in the network shown in FIG. 9, with all domain connections managed by legacy RSVP, setup of an E2E reservation from H1 to H6 would require shadow reservations with QM1, QM2, and QM3, leading to the shadow sessions of QM2 and QM3 being managed by the domain connection between BR1 and BR2. Finally, the sequential exchange of shadow Path and Resv messages between an initiating host and more and more distant QMs may lead to undesirably long shadow reservation setup times.

Another potential issue with sender-model signaling is that, due to the sequence of messages exchanged between an initiating host and QMs, this signaling cannot provide information about the DSCP selection within downstream DS domains (at least not without multi-phase communication, which is unacceptable), making dynamic upstream DSCP re-marking impossible. In some cases, it may be possible to substitute such remarking by dynamic downstream DSCP re-marking, which is possible with sender-model signaling using the enhancement described in section A.4.2. However, in some cases dynamic upstream DSCP re-marking may be desired or is even required for efficient operation of RSVP Shadowing (see section A.5.1).

To address these issues, the invention may use an alternative signaling model called "hop model". With this model, RSVP Shadowing communication is generally performed between adjacent RSVP Shadowing entities, i.e., between a host and its local QM, or between QMs of adjacent DS domains. Therefore, an initiating host only needs to associate a shadow reservation established at the local QM with a corresponding E2E reservation. Each QM associates a shadow reservation established with an upstream RSVP Shadowing entity (host or QM) with a corresponding E2E reservation, as usual for the invention, but additionally associates a shadow reservation established with a downstream RSVP Shadowing entity (if present) with the upstream shadow and the E2E reservation.

Figure 13:
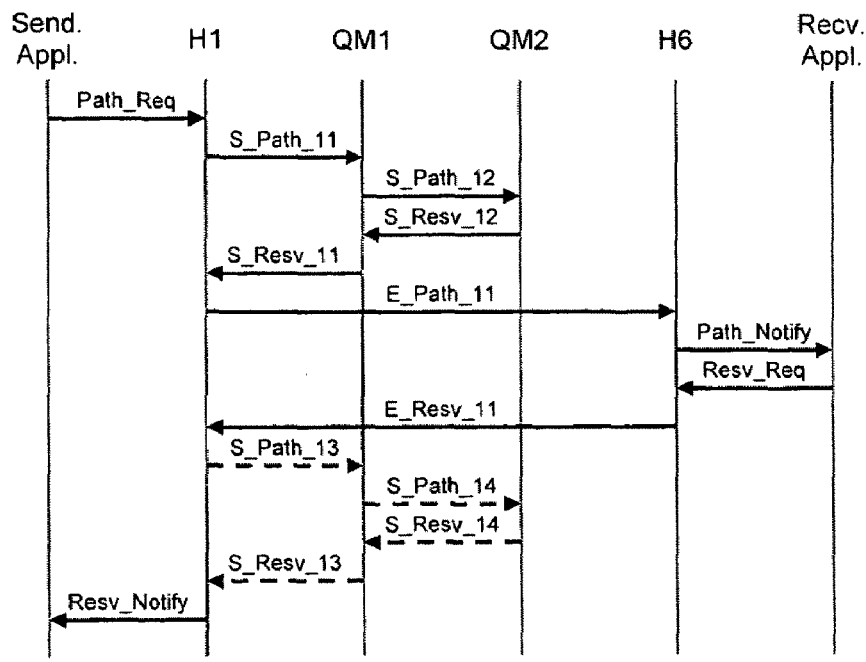

The following description replicates the reservation setup example described in section A.3.2, this time using hop-model signaling instead of sender-model signaling, but otherwise assuming identical behavior. The description focuses on the differences between the two models, so operations identical with both models will not be discussed in full detail, please consult section A.3.2 for further information. A signaling diagram of this example is shown in FIG. 13.

Firstly, H1 sends an initial shadow Path message (S_Path_11) to QM1, to request DiffServ-style reservation setup for the corresponding E2E data flow. This message is identical to S_Path_1 of the sender-model signaling. QM1 performs admission control, potentially configures its domain, and synthesizes E2E Adspec parameters, as usual for the invention.

Secondly, QM1 sends an initial shadow Path message (S_Path_12) to QM2, to request DiffServ-style reservation setup for the corresponding E2E data flow further along the E2E data path. The shadow session identification contains QM2's address, the shadow protocol ID value of 253, and the shadow destination port value of 12345. The shadow sender template comprises QM1's address and a shadow source port value of 6000, the latter not currently being used by QM1 for any other shadow reservation within QM2's shadow session. The E2E-related parameters are the same as in S_Path_11, except for the E2E ADSPEC object, which contains parameters composed from the initial parameters provided by S_Path_11 and the parameters synthesized by QM1 for the DiffServ-managed part of the E2E data path through DS domain 1. Hence this ADSPEC object is identical to the one within S_Resv_1 of the sender-model signaling. QM2 performs admission control, potentially configures its domain, and synthesizes E2E Adspec parameters, as usual for the invention.

Thirdly, as QM2 is the last QM to be contacted for DiffServ-style reservation setup for the corresponding E2E data flow along the E2E data path, QM2 sends a shadow Resv message (S_Resv_12) corresponding to S_Path_12 back towards QM1, to inform QM1 about the admitted E2E reservation request and provide the related parameters. The shadow session identification is a copy from S_Path_12. Assuming that there are currently no other shadow reservations established at QM2, the shadow filter spec list will only contain a FILTER_SPEC object corresponding to the shadow sender template of S_Path_12. The shadow sender template is a copy of the shadow sender template of S_Path_12. The E2E DCLASS object lists two DSCPs, one for the GS and one for the CL service, both of which applicable to DS domain 2. Hence this object is identical to the one within S_Resv_2 of the sender-model signaling. The E2E Adspec contains parameters composed from the parameters provided by S_Path_12 and the parameters synthesized by QM2 for the DiffServ-managed part of the E2E data path through DS domain 2. Hence this object is also identical to the one within S_Resv_2 of the sender-model signaling, except for QM-controlled reshaping (see below). QM1 detects that S_Resv_12 is related to one of its shadow reservations, and extracts S_Resv_12's E2E DCLASS and ADSPEC objects. If the DSCP(s) to be used for DS domain 2 differed from the ones to be used for DS domain 1, and if this difference were not covered by a static DSCP remarking agreement between DS domain 1 and DS domain 2, QM1 would set up dynamic DSCP re-making of packets outbound to DS domain 2. However, as this example assumes behavior identical to the sender-model example, the DSCPs of the two DS domains will either be identical or suitable for static DSCP re-marking.

Fourthly, QM1 sends a shadow Resv message (S_Resv_11) corresponding to S_Path_11 back towards H1, to inform H1 about the admitted E2E reservation request and provide the related parameters. The shadow session identification is a copy from S_Path_11. Assuming that there are currently no other shadow reservations established at QM1, the shadow filter spec list will only contain a FILTER_SPEC object corresponding to the shadow sender template of S_Path_11. The shadow sender template is a copy of the shadow sender template of S_Path_11. The E2E DCLASS object lists two DSCPs, one for the GS and one for the CL service, both of which applicable to DS domain 1. The E2E ADSPEC object is simply a copy of the E2E ADSPEC object of S_Resv_12, except for QM-controlled reshaping (see below). H1 detects that S_Resv_11 is related to one of its shadow reservations, stores the E2E DCLASS object of S_Resv_11 for later DSCP marking, and extracts S_Resv_11's E2E ADSPEC object. Furthermore, the reception of S_Resv_11 indicates H1 that the reservation request for the corresponding E2E data flow has been admitted for the whole DiffServ-managed part of the E2E data path.

Fifthly, H1 sends an initial, real E2E Path message (E_Path_11) to H6, without RSVP Shadowing extensions, to prepare RSVP-style reservation setup along the parts of the E2E data path managed by legacy RSVP. This message is identical to E_Path_1 of the sender-model signaling, although the ADSPEC object is a copy of the E2E ADSPEC object of S_Resv_11, because the latter object is identical to the one within S_Resv_2 as described above. The receiving application on H6 is assumed to select the same E2E reservation parameters as in the sender-model example.

Sixthly, H6 sends a real E2E Resv message (E_Resv_11) corresponding to E_Path_11 back towards H1, to set up the E2E reservation along the parts of the E2E data path managed via legacy RSVP, and to inform H1 about the parameters of the E2E reservation. This message is identical to E_Resv_1 of the sender-model signaling. With this message successfully processed by H1, the E2E reservation for the E2E data flow is in principle established. However, H1 decides to adjust the shadow reservations to get rid of the (potentially) wasted GS shadow reservations, as in the sender-model example.

Seventhly, H1 sends an updated shadow Path message (S_Path_13) to QM1, to request adjustment of the DiffServ-style reservation for the corresponding E2E data flow. This message is a copy of S_Path_11, except for the changed E2E ADSPEC object and the added E2E STYLE and FLOWSPEC objects, the latter two being copies of the respective objects of E_Resv_11. The E2E Adspec must contain the same CL-related parameters as in S_Path_11, but may use another distribution into general and service-specific parameters due to the removed GS service fragment. QM1 reclaims the GS-related resources, potentially changes the CL-related reservation and synthesizes corresponding "better" E2E Adspec parameters, and stores the information from the E2E STYLE and FLOWSPEC objects, for future admission control and configuration.

Eighthly, QM1 sends an updated shadow Path message (S_Path_14) to QM2, to request adjustment of the DiffServ-style reservation for the corresponding E2E data flow further along the E2E data path. This message is a copy of S_Path_12, except for the E2E ADSPEC object, which only contains CL-related parameters, either the same ones as in S_Path_12 or new ones corresponding to the changed CL reservation, but may use another distribution into general and service-specific parameters due to the removed GS service fragment. QM2 reclaims the GS-related resources, potentially changes the CL-related reservation and synthesizes corresponding "better" E2E Adspec parameters, and stores the information from the E2E STYLE and FLOWSPEC objects, for future admission control and configuration.

Ninthly, as QM2 is the last QM to be contacted for Diff-Serv-style reservation adjustment for the corresponding E2E data flow along the E2E data path, QM2 sends an updated shadow Resv message (S_Resv-14) corresponding to S_Path_14 back towards QM1, to inform QM1 about the successful adjustment of the shadow reservation and provide the related parameters. The shadow session identification is a copy from S_Path_14. Assuming that there are still no other shadow reservations established at QM2, the shadow filter spec list will only contain a FILTER_SPEC object corresponding to the shadow sender template of S_Path_14. The shadow sender template is a copy of the shadow sender template of S_Path_14. The E2E DCLASS object only lists the DSCP applicable to the CL service within DS domain 2. If QM2 has changed the CL reservation, this DSCP may have a different value compared to the CL service's DSCP contained in S_Resv_12. As usual, the E2E Adspec comprises parameters composed from the parameters provided by S-Path_14 and the parameters synthesized by QM2 for DS domain 2, with the latter maybe having different values compared to step 3 if the CL reservation has been changed. As the E2E DCLASS and ADSPEC objects differ from S_Resv_12 (and its potential refreshes), QM2 need not toggle the presence of the NULL object (see section A.2.2). QM1 detects that S_Resv_14 confirms the shadow reservation adjustment requested by S_Path_14, and extracts S_Resv_14's E2E DCLASS and ADSPEC objects. Again, different DSCP values used within DS domain 1 and DS domain 2 may in principle lead to setup of dynamic upstream DSCP re-marking, but not in this example.

Tenthly, QM1 sends an updated shadow Resv message (S_Resv_13) corresponding to S_Path_13 back towards H1, to inform H1 about the successful adjustment of the shadow reservation and provide the related parameters. The shadow session identification is a copy from S_Path_13. Assuming that there are still no other shadow reservations established at QM1, the shadow filter spec list will only contain a FILTER_SPEC object corresponding to the shadow sender template of S_Path_13. The shadow sender template is a copy of the shadow sender template of S_Path_13. The E2E DCLASS object only lists the DSCP applicable to the CL service within DS domain 1. If QM1 has changed the CL reservation, this DSCP may have a different value compared to the CL service's DSCP contained in S_Resv_11. The E2E ADSPEC object is simply a copy of the E2E ADSPEC object of S_Resv_14. As the E2E DCLASS and ADSPEC objects differ from S_Resv_11 (and its potential refreshes), QM1 need not toggle the presence of the NULL object (see section A.2.2). H1 detects that S_Resv_13 confirms the shadow reservation adjustment requested by S_Path_13, and stores the E2E DCLASS object of S_Resv_13 for later DSCP marking. However, H1 need not extract S_Resv_13's E2E ADSPEC object as the Adspec is not processed any further.

With the successful adjustment of the shadow reservations, the E2E reservation for the E2E data flow is finally established. Therefore, the sending application on H1 can now be notified about the reservation and its parameters, enabling it to start sending of the E2E data flow. FIG. 13 shows a signaling diagram of the hop-model reservation setup discussed above, including requests from and notifications to the sending/receiving application. As the shadow messages used for adjustment of the shadow reservations are in principle optional, they are shown with dashed arrows. Please note that the numbering of the messages indicates corresponding messages, not the sequence of the messages.

Another difference between sender-model and hop-model signaling is the signaling of error conditions and teardown requests. With sender-model signaling, an error condition is directly reported to an initiating host by a shadow PathErr message sent by the error-detecting node (see section A.2.3), and the initiating host may need to tear down associated shadow reservations already established with other QMs for a corresponding E2E data flow. This scheme also applies to teardown request sent by QMs by means of shadow ResvTear messages (see section A.2.6). Similarly, teardown requests initiated by a host by means of shadow PathTear messages (see section A.2.5) may need to be addressed to multiple QMs to free resources allocated to a corresponding E2E data flow all along the E2E data path.

With hop-model signaling, there is no direct communication between an initiating host and remote QMs. Therefore, a QM must propagate RSVP Shadowing messages indicating error conditions or teardown requests to the appropriate upstream or downstream RSVP Shadowing entity, depending on the type of shadow RSVP message, using its internal association of upstream and downstream shadow reservations. For instance, considering the example discussed above and an error condition detected by QM2 on reception of S_Path_12, QM2 would send a shadow PathErr message instead of S_Resv_12 back towards QM1. QM1 would in turn send an equivalent shadow PathErr message instead of S_Resv_11 back towards H1, to inform H1 about the error condition. If H1 decided to send a shadow PathTear message to QM1, to tear down potentially partially installed path state, QM1 would be responsible to propagate an equivalent shadow Path-Tear message downstream towards QM2.

With hop-model signaling, there is no need to include next shadow hop information into shadow Resv messages, as an initiating host anyway performs RSVP Shadowing communication with the local QM only. However, the required configuration of hosts and QMs regarding shadow session identifications of RSVP Shadowing entities to be contacted is equivalent to the one of the next shadow hop information enhancement (see section A.4.1).

On the other hand, the dynamic downstream DSCP re-marking enhancement (see section A.4.2) may be used with hop-model signaling if this re-marking mechanism is preferred over the upstream re-marking mechanism anyway supported by the hop model, or if both mechanisms should be used concurrently. However, there is no need to copy DCLASS objects from shadow Resv messages to shadow Path messages as with sender-model signaling. Instead, each QM, except for the last QM to be contacted for setup of the shadow reservations, can directly place a DCLASS object indicating its DSCP selection into shadow Path messages sent to a downstream DS domain's QM.

Hop-model signaling can also be combined with QM-controlled reshaping for Guaranteed Service (see section A.4.3). However, there is no need to report composed GS sum error term parameters since the last reshaping point back to an initiating host, as the initiating host does not send further shadow Path messages into which these parameters would be copied, and the computation of the GS sum parameters to be placed into the initial E2E Path message can be performed by the QMs instead of the initiating host. Thus the standard GS sum parameter fields of the GS service fragment within the E2E ADSPEC objects carried by a shadow Resv message can be abused to carry the RSVP-Shadowing-specific between-parameters instead of the standard since-parameters. However, if a company dislikes such reinterpretation of standard RSVP fields, the extended GS service fragment format intended for QM-controlled reshaping with sender-model signaling may also be used for shadow Resv messages sent with hop-model signaling. In this case, the standard since-parameter fields are simply ignored by the invention.

Regardless of the Adspec fields used to carry the between-parameters, the interpretation and the processing of GS sum parameters must differ from the sender model, given the hop-by-hop processing by adjacent QMs. As usual for the invention, each QM computes its local since- and between-parameters. However, instead of reporting the local since-parameters back to the initiating host, for copying into the next shadow Path message, these parameters can simply be placed into the shadow Path message sent to the QM of the adjacent downstream domain. Furthermore, the parameters in the E2E Adspec of a shadow Resv message reflect the worst-case properties of the E2E data path from the sender, or from a reshaper upstream of a particular DS domain, to the receiver of the E2E data flow for which the reservation is to be established. The reason for this is simply that the QMs must already perform the computation of the parameters to be placed into the initial E2E Path message while the parameters are transported back towards the initiating host.

The last QM to be contacted for setup of the shadow reservations starts the computation by placing the maximum of its local since- and between-parameters into the shadow Resv message to be sent upstream. If no QM-controlled reshaping has been set up by the last QM, the local since-parameters will simply be used for that shadow Resv message. If it has not configured QM-controlled reshaping, a QM receiving a shadow Resv message will simply copy the received parameters into the shadow Resv message to be sent upstream, or will otherwise use the maximum of the received values and its local between-parameters. Via this mechanism, the computation of the parameters for the initial E2E Path message is the same as for sender-model signaling, except for being performed hop by hop by the QMs.

Figure 14:
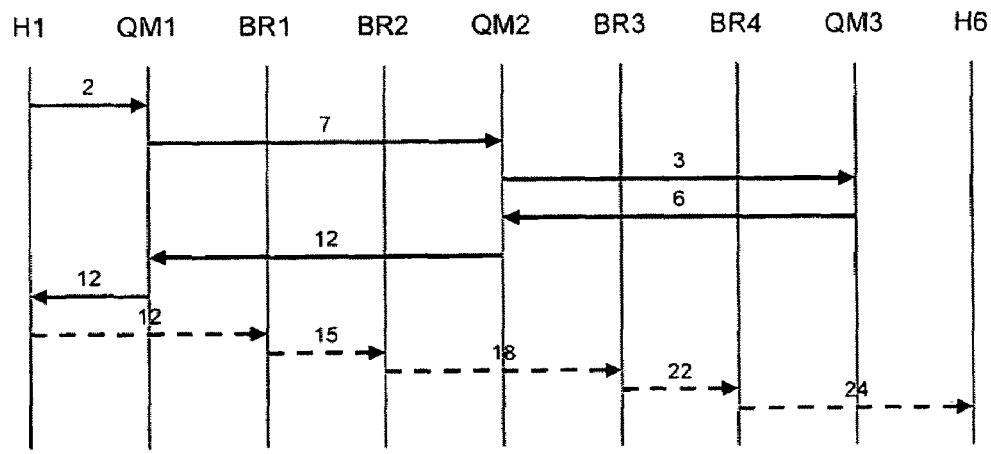

FIG. 14 shows a signaling diagram corresponding to the QM-controlled reshaping example described in section A.4.3, this time using hop-model signaling, but otherwise the same network as show in FIG. 11. Continuous arrows from left to right indicate shadow Path messages, continuous arrows from right to left indicate shadow Resv messages, and dashed arrows indicate the E2E Path message, divided into fragments per RSVP hop to highlight the E2E Adspec update along the E2E data path. The numbers reflect the value of the specific sum parameter in each message.

Up to the reshaping point in DS domain 2, the composition of the sum parameter value is 12, resulting in a local between-parameter value of 12 to be stored by QM2. The local since-parameter of QM2, with a value of 3, is placed into the shadow Path message sent to QM3. As QM3 is the last QM to be contacted and has not configured QM-controlled reshaping, it uses its local since-parameter, with a value of 6, as the between-parameter of the shadow Resv message sent back towards QM2. QM2 compares the received parameter with its stored local between-parameter, and places the maximum between-parameter value of 12 into the shadow Resv message sent back towards QM1, who simply propagates this value to H1. Consequently, H1 sends the initial E2E Path message with a since-value of 12, as with the sender model.

A.4.5. API Enhancements

As described above (see in section "Background of the invention") and A.3.2, the operation of the RSVP Shadowing stacks is in principle transparent to applications. These may simply use an RSVP-style API to request RSVP reservation setup as with legacy RSVP, with the RSVP Shadowing operation never apparent to the applications. Hence, from the applications' point of view, it may seem as if legacy RSVP functionality were provided by the RSVP Shadowing stacks. Although this requires an RSVP-style API, it does not demand a particular RSVP API.

An approach to a generic RSVP API is proposed by [RFC 2205]. The Open Group followed this proposal quite strictly, leading to the definition of The Open Group's Resource Reservation Setup Protocol API ([RAPI]), which uses an interface defined in the programming language C. Another RSVP-style API, the KOM API ([KOM]), uses a more object-oriented approach, with an interface defined in the programming language C++. An RSVP Shadowing stack implementation may provide any of these interfaces, an adaptation of these interfaces, or a completely individual interface, whether object-oriented or not, as long as it generally reflects the behavior of RSVP. Which approach is taken will typically depend on the presence of standard RSVP applications and the interface(s) they use.

Whereas such a standard RSVP API is in principle sufficient for operation of RSVP Shadowing, some RSVP-Shadowing-specific API enhancements may be desirable. For example, means to optionally specify the expected duration of a reservation to be established may be helpful, as this information may be valuable on deciding whether or not over-provisioned shadow reservations should be adjusted (see section A.3.2). Depending on the API and programming language used by an RSVP Shadowing stack and on the desired level of compatibility with standard RSVP applications, it may be more or less easy to provide at the API parameters related to such enhancements.

In case that an RSVP Shadowing API not intended to be compatible with standard RSVP applications, enhancement-related parameters can directly built into the general API, or, for optional parameters, be provided in a way suitable for the programming language. Ways to implement optional parameters in C are, e.g., function or structure parameters with special "unused" values, pointer parameters set to NULL if unused, unions of structure parameters each of which representing special use cases identified by a specific selection parameter, or variable-length data structures being parsed for arbitrary parameters. With C++, function and class overloading provide additional, more sophisticated means to implement optional parameters.

In case that an RSVP Shadowing API should be compatible with standard RSVP applications, any enhancement should be implemented in a way transparent to the applications. With C++, function and class overloading will nearly always provide a way to do so, regardless of the RSVP API used by the applications, as standard applications can use the "basic" version of a function or class while RSVP-Shadowing-aware applications use an overloaded one. However, transparent implementation of enhancement-related parameters with C may be difficult or even impossible, depending on the standard RSVP API used by the standard applications. If that API uses some of the optional parameter techniques described above, it might be possible to exploit them to provide enhancement-related parameters (see section A.4.6). If no other solution is feasible, an RSVP Shadowing stack may provide multiple APIs, some of which compatible to the standard RSVP API(s) used by standard applications, and another one used by RSVP-Shadowing-aware applications.

A.4.6. RSVP-Shadowing-specific Services

So far only the standard IntServ services GS and CL have been considered, given the fact that these should be supported by RSVP Shadowing for full IntServ/RSVP compliance, and compatibility with standard RSVP applications (if desired). However, a company may want or need to define services specific to RSVP Shadowing, although such services might only be usable by RSVP-Shadowing-aware applications.

The IntServ architecture reserved the service number values from 128 to 254 for experimental or private services. Hence new services can easily be defined by choosing a service number appropriate for the company network and specifying the Adspec and flowspec parameters to be used for the new service, as well as their treatment by RSVP Shadowing.

Regarding the API of an RSVP Shadowing stack, RSVP-Shadowing-specific services represent API enhancements with related parameters not reflected by standard RSVP. These parameters may be provided by the means discussed in section A.4.5. Whether this is done in a way compatible with standard RSVP applications or not depends on the presence of such applications, and the API and programming language used for an RSVP Shadowing stack, as also discussed section A.4.5. However, as extension of the service set has been foreseen by the IntServ architecture, it's assumed that new services can often be integrated into the API of an RSVP Shadowing stack in a way compatible with standard RSVP applications. For example, the RAPI API may be used for a standard RSVP application and an RSVP Shadowing stack, both of which written in C, which prevents the use of function overloading to provide enhancement-related parameters, but RAPI optionally allows to specify the IntServ data structures in a generic format not specific to any service. Hence this functionality could be exploited to provide RSVP-Shadowing-specific service parameters instead of the GS- or CL-related parameters used within these structures by standard RSVP applications.

Regarding the realization of RSVP-Shadowing-specific services within a company network, RSVP Shadowing can in principle support all services which are realizable by the company's DS domains with respect to the configuration of DiffServ equipment, PHBs, and traffic conditioning mechanisms by the QMs, including sender nodes and their downstream links (see section A.3.1). However, for general operation of the invention, it must be assured that such services can also be supported along the parts of an E2E data path managed by legacy RSVP, which will typically limit the services supported along said parts of an E2E data path to the standard GS and CL services.

To reflect legacy RSVP equipment along the E2E data path, one approach is to map within the RSVP Shadowing stack of an initiating host RSVP-Shadowing-specific service requests to a suitable equivalent or better GS or CL service request, and to use that replacement service for both the shadow and the E2E reservation setup. Another approach is to use the RSVP-Shadowing-specific service for setup of the shadow reservations and a replacement service for setup of the E2E reservation, after some suitable transformation of the E2E Adspec parameters of the RSVP-Shadowing-specific service to the replacement service. As an example of service replacement, please consider an RSVP-Shadowing-specific service designed to provide a no-loss guarantee but no specific delay bound, in which case it would be possible to replace this service with GS service for legacy RSVP compatibility.

A.5. Legacy-free Operation

In contrast to the general operation of the invention, which is designed for interoperation with legacy RSVP equipment along the E2E data path of an E2E data flow for which a reservation is to be established, legacy-free operation of the invention means that there is no legacy RSVP equipment within a company network, or that the RSVP functionality of such equipment is disabled. Furthermore, it means that no domain connection is managed by legacy RSVP. Hence the only part of an E2E data path managed by standard RSVP might be a sending node and its downstream link, but this behavior is controlled by an RSVP Shadowing stack, not by a legacy RSVP implementation (see section A.3.1). This means that the reservation setup for the sender and its downstream link normally performed for general operation on reception of an E2E Resv message could in this case also be performed by an RSVP Shadowing stack without such message, e.g., automatically after reception of the last shadow Resv message before notification of the requesting application.

Therefore, the two fundamental reasons for the E2E RSVP signaling in addition to the shadow communication, namely the collection of Adspec parameters and setup of reservations along the parts of the E2E data path managed by legacy RSVP, are no longer relevant. The remaining functionality of the E2E signaling is to provide a means to the receiver of the corresponding E2E data flow to select the reservation parameters and issue later reservation teardown requests. However, this functionality could more efficiently be integrated into the shadow communication if that communication were extended to include the receiver of a corresponding E2E data flow. Moreover, shadow communication including the receiver and using hop-model signaling could eliminate the need for a second phase of shadow communication for adjustment of the shadow reservations, as the adjustments could automatically be performed during the transport of the shadow Resv messages back to an initiating host. Finally, such communication could even enable QMs to postpone establishment of shadow reservations until reception of said shadow Resv messages, as long as they could someway provide suitable E2E Adspec parameters for the corresponding shadow Path messages.

A.5.1. Logical-E2E-Model Signaling

Because of the said advantages, legacy-free operation of the invention typically uses a signaling model similar to the hop model but including the receiver of an E2E data flow, which is called the "logical E2E model", given that there no longer is a real E2E reservation for the E2E data flow, but only a logical one actually being represented by the shadow reservations corresponding to that logical E2E reservation.

Figure 15:
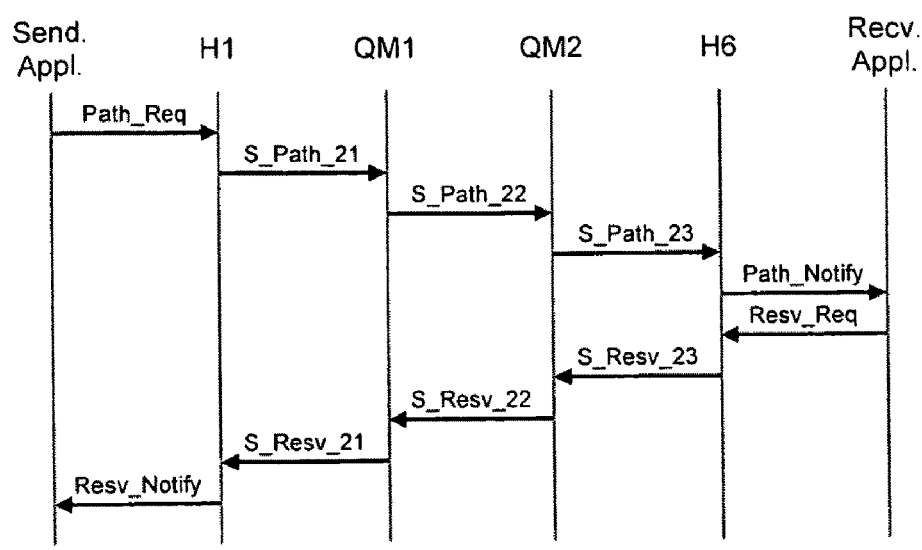

The following description replicates the reservation setup example described in section A.3.2, this time using logical-E2E-model signaling, and DiffServ-style management of the domain connection by QM1 (see section A.3.1), but otherwise assuming identical behavior. Due to the similarities between logical-E2E-model and hop-model signaling, the description focuses on the differences between these two models, so operations identical with both models will not be discussed in full detail, please consult section A.4.4 for further information. A signaling diagram of this example is shown in FIG. 15.

Firstly, H1 sends an initial shadow Path message (S_Path_21) to QM1, to request DiffServ-style reservation setup for the corresponding E2E data flow. This message is identical to S_Path_11 of the hop-model signaling. QM1 performs admission control, potentially configures its domain, and synthesizes E2E Adspec parameters, as usual for the invention. However, this time these operations must include the domain connection, except BR2. Furthermore, QM1 may choose to postpone the parts of said configurations not necessary to synthesize the E2E Adspec parameters. However, as this example assumes behavior identical to the sender-model example, QM1 performs full setup of the shadow reservations.

Secondly, QM1 sends an initial shadow Path message (S_Path_22) to QM2, to request DiffServ-style reservation setup for the corresponding E2E data flow further along the E2E data path. This message is identical to S_Path_12 of the hop-model signaling, except for the E2E ADSPEC object, which contains parameters composed from the initial parameters provided by S_Path_21 and the parameters synthesized by QM1 for the DiffServ-managed part of the E2E data path through DS domain 1 and the domain connection. QM2 performs admission control, potentially configures its domain, and synthesizes E2E Adspec parameters, as usual for the invention. However, this time these operations must include BR2 and the link from BR2 to S3. Like QM1, QM2 may in principle choose to postpone the parts of said configurations not necessary to synthesize the E2E Adspec parameters, but not in this example.

Thirdly, QM2 sends an initial shadow Path message (S_Path_23) to H6, to inform H6 that shadow path state has been established for the corresponding E2E data flow, and to provide the related E2E parameters. The shadow session identification contains H6's address, the shadow protocol ID value of 253, and the shadow destination port value of 12345. The shadow sender template comprises QM2's address and a shadow source port value of 7000, the latter not currently being used by QM2 for any other shadow reservation within H6's shadow session. The E2E-related parameters are the same as in S_Path_22, except for the E2E ADSPEC object, which contains parameters composed from the parameters provided by S_Path_22 and the parameters synthesized by QM2 for the DiffServ-managed part of the E2E data path through DS domain 2 to H6. Hence this ADSPEC object already represents the properties of the whole E2E data path of the E2E data flow for which the reservation is to be established, without any need for real E2E RSVP signaling. The receiving application on H6 is assumed to select the same E2E reservation parameters as in the sender-model example.

Fourthly, H6 sends a shadow Resv message (S_Resv_23) corresponding to S_Path_23 back towards QM2, to inform QM2 about the E2E reservation parameters selected for the corresponding E2E data flow. This shadow Resv message differs from the format used for general operation of the invention (see section A.2.2) as follows: First, additional E2E STYLE and FLOWSPEC sub-objects are placed into the RSVP Shadowing extension object of the message, to carry the E2E reservation parameters. Furthermore, with logical-E2E-model signaling there is no need to transport E2E Adspec parameters back towards the initiating host, so the E2E ADSPEC object is always omitted. Finally, as H6 is no QM, there is no need to include an E2E DCLASS object into the message, so this object is also omitted. The shadow session identification is a copy from S_Path_23. Assuming that there are currently no other shadow reservations established at H6, the shadow filter spec list will only contain a FILTER_SPEC object corresponding to the shadow sender template of S_Path_23. The shadow sender template is a copy of the shadow sender template of S_Path_23. QM2 detects that S_Resv_23 is related to one of its shadow reservations, and checks the E2E STYLE and FLOWSPEC objects for the reservation parameters selected by the receiver. These parameters are treated as an implicit shadow reservation adjustment request, similarly to the corresponding parameters carried by updated shadow Path messages for shadow reservation adjustment with general operation of the invention. Therefore, QM2 reclaims the GS-related resources, potentially changes the CL-related reservation, and stores the information from the E2E STYLE and FLOWSPEC objects, for future admission control and configuration. If QM2 had only partially set up the CL-related reservation in step 2, it would now have completed that setup according to the reservation parameters, instead of keeping or changing the reservation, but not in this example.

Fifthly, QM2 sends a shadow Resv message (S_Resv_22) corresponding to S_Path_22 back towards QM1, to inform QM1 about the admitted E2E reservation request and provide the related parameters. This shadow Resv message has the same format as S_Resv_23, except for an additional E2E DCLASS object, as QM2 must report its DSCP selection as usual for the invention. Hence that object only lists the DSCP applicable to the CL service within DS domain 2. The shadow session identification is a copy from S_Path_22. Assuming that there are currently no other shadow reservations established at QM2, the shadow filter spec list will only contain a FILTER_SPEC object corresponding to the shadow sender template of S_Path_22. The shadow sender template is a copy of the shadow sender template of S_Path_22. In this example, the E2E STYLE and FLOWSPEC objects are copies of the respective objects within S_Resv 23, given the selected CL service. However, for the GS service or RSVP-Shadowing-specific services, a QM may choose to change flowspec parameters according to the rules of the respective service (see below). QM1 detects that S_Resv_22 is related to one of its shadow reservations, and processes it like QM2 did with S_Resv_23. Furthermore, it checks whether the DSCP to be used for DS domain 2 is the same as the DSCP to be used for DS domain 1, or whether distinct DSCP values are covered by a static DSCP re-marking agreement between DS domain 1 and DS domain 2. If neither were the case, QM1 would set up dynamic DSCP re-making of packets outbound to DS domain 2. However, as this example assumes behavior identical to the sender-model example, the DSCPs of the two DS domains are will either be identical or suitable for static DSCP re-marking.

Sixthly, QM1 sends a shadow Resv message (S_Resv_21) corresponding to S_Path_21 back towards H1, to inform H1 about the admitted E2E reservation request and provide the related parameters. This shadow Resv message has the same format as S_Resv_22. The shadow session identification is a copy from S_Path_21. Assuming that there are currently no other shadow reservations established at QM1, the shadow filter spec list will only contain a FILTER_SPEC object corresponding to the shadow sender template of S_Path_21. The shadow sender template is a copy of the shadow sender template of S_Path_21. The E2E DCLASS object only lists the DSCP applicable to the CL service within DS domain 1. In this example, the E2E STYLE and FLOWSPEC objects are copies of the respective objects within S_Resv_22. H1 detects that S_Resv_21 is related to one of its shadow reservations, stores the E2E DCLASS object of S_Resv_21 for later DSCP marking, and extracts S_Resv_21's E2E STYLE and FLOWSPEC objects. Furthermore, the reception of S_Resv_21 indicates H1 that the reservation request for the corresponding E2E data flow has been admitted for the whole DiffServ-managed part of the E2E data path. Therefore, H1 can now perform reservation setup for itself and the downstream link, according to the reservation parameters provided by S_Resv_21. Assuming that this operation succeeds, the E2E reservation for the E2E data flow will completely be established, without any need for further real E2E signaling or explicit adjustment of shadow reservations. Hence the sending application on H1 can now be notified about the reservation and its parameters, enabling it to start sending of the E2E data flow.

FIG. 15 shows a signaling diagram of the logical-E2E-model reservation setup discussed above, including requests from and notifications to the sending/receiving application. Please note that the numbering of the messages indicates corresponding messages, not the sequence of the messages.

Like hop-model signaling, logical-E2E-model signaling requires propagation of RSVP Shadowing messages indicating error conditions and teardown requests to the appropriate upstream or downstream RSVP Shadowing entity. However, whereas shadow ResvErr messages corresponding to an E2E reservation should with general operation of the invention in principle only occur due to misconfiguration (see section A.2.4), such messages may rightfully occur with legacy-free operation using logical-E2E-model signaling, to report admission control errors. One reason for such a message is a shadow reservation only having been partially configured within a DS domain on reception of a shadow Path message, but for which the further configuration fails on processing of a corresponding shadow Resv message. Another reason is a shadow reservation completely having been configured within a DS domain on reception of a shadow Path message, but found to be under-provisioned with regard to a received corresponding shadow Resv message. As with general operation of the invention, under-provisioned shadow reservations must be adjusted, which may lead to admission control failure. However, adjustment of over-provisioned shadow reservations should not lead to admission control failures, as with general operation of the invention.

Like with hop-model signaling, there is no need to include next shadow hop information into shadow Resv messages sent with logical-E2E-model signaling, and the required configuration of hosts and QMs regarding shadow session identifications of RSVP Shadowing entities to be contacted is also equivalent to the one of the next shadow hop information enhancement (see section A.4.1).

Whereas logical-E2E-model signaling can be combined with the dynamic downstream DSCP re-marking enhancement (see section A.4.2), it cannot provide the full functionality of that enhancement, given that the DSCP selection reported by a QM within the DCLASS object of a shadow Path message would not be valid any more if that QM changed its shadow reservation on reception of a corresponding shadow Resv message, leading to a different DSCP than reported before. Therefore, to support dynamic downstream DSCP re-marking, the DSCP selection must not change because of adjustment of shadows reservations, in any DS domain except the one in which the receiver of the corresponding E2E data flow is located. However, that enhancement should rarely be required for logical-E2E-model signaling, as dynamic upstream DSCP re-marking anyway supported by the logical-E2E model should most often provide an acceptable replacement.

Logical-E2E-model signaling can seamlessly be combined with QM-controlled reshaping for Guaranteed Service (see section A.4.3). However, there is no need to report any composed GS sum error term parameters, whether since a reshaping point or between reshaping points, back to an initiating host, as there are neither further shadow Path messages nor a real E2E Path message for which these parameters would be necessary. Hence all of the signaling enhancements related to QM-controlled reshaping, whether for sender-model signaling (see section A.4.3) or for hop-model signaling (see section A.4.4), are not necessary with logical-E2E-model signaling. Instead, each QM only needs to evaluate the standard E2E-related since-parameters provided by a received shadow Path message sent by an upstream sender or QM, and to provide the resulting since-parameter to the next QM (or the receiver) by means of its shadow Path message, as usual for the invention.

A.5.2. Mitigation of Issues and Restrictions Compared to General Operation

Besides enabling to use logical-E2E-model signaling providing several advantages as described in section A.5.1, legacy-free operation of the invention mitigates or eliminates all of the restrictions relevant to general operation of the invention (see sections A.3.3 and A.4.6), depending on the signaling model. However, there should rarely be a reason to use sender- or hop-model signaling for legacy-free operation of the invention, unless unrestricted dynamic downstream DSCP re-marking is really required within a company network (see section A.5.1).

One issue with general operation is that the E2E Adspec parameters collected by shadow Path messages may not reflect the parameters of upstream parts of the E2E path managed by legacy RSVP, whereas these parameters are always accurate with legacy-free operation, eliminating the need for additional worst-case processing/queuing delay information about said parts of the E2E data path, for all signaling models. Hence a QM can for buffer size calculation rely on the GS sum error term parameters provided by shadow Path messages. It can also rely on the provided GS total error term parameters in case of exploiting a non-zero GS Slack Term parameter (see below).

One restriction of general operation is that reservations using the GS service must be restricted to FF-style reservations, to avoid reshaping by legacy RSVP equipment at data flow merge points, leading to a reset of GS sum parameters and potentially to under-provisioned buffering. With legacy-free operation, the GS service can also be used with shared reservation styles, for all signaling models, provided that appropriate QM-controlled reshaping can be set up within the company network. In case that reshaping capability is not available at a data flow merge point, a QM may choose to reserve resources corresponding to an FF-style reservation up to a downstream reshaping point, and to reserve resources corresponding to the shared reservation downstream of that reshaping point.

Another restriction of general operation is that the GS Slack Term parameter (S) must be set to zero, to avoid adjustment of the GS service rate parameter (R) by legacy RSVP equipment. As there is no legacy RSVP equipment with legacy-free operation, this restriction is eliminated for all signaling models. However, sender- and hop-model signaling cannot process these parameters as intended by the GS service specification, as the E2E Resv message is directly sent from the receiving host to the sending host and not processed by "intermediate" QMs. Hence only the RSVP Shadowing stack of the initiating host could exploit a non-zero slack term, e.g., by reducing its reservation on the downstream link, or by not adjusting under-provisioned shadow reservations according to a too large service rate parameter if the Slack Term covers the resulting additional E2E delay. On the other hand, logical-E2E-model signaling enables QMs to process these parameters as intended, potentially gradually using up the slack according to the configuration of DiffServ equipment reverse along the E2E data path.

A further restriction of general operation is that RSVP-Shadowing-specific services must typically be mapped to equivalent GS or CL services, to enable operation of RSVP-Shadowing-specific services across legacy RSVP equipment. With legacy-free operation, all services realizable through configuration of a company network's DiffServ equipment by the QMs can directly be supported, for all signaling models, typically leading to a broader set of RSVP-Shadowing-specific services than achievable via said service mapping.

If legacy-free operation of the invention is used with sender- or hop-model signaling and QM-controlled reshaping, the computation of the GS sum error term parameter to be placed into the E2E Path messages should be adapted to legacy-free operation. As only the RSVP Shadowing stack of the receiver or the receiving application itself might use that sum parameters for buffer setup, there is no longer a need to reflect the worst-case section of the E2E data path for each sum parameter, respectively. Instead, that sum parameter should only reflect the properties of the E2E data path from the last reshaping point to the receiver, like the corresponding parameters reported by the shadow Path message sent to the receiver with logical-E2E-model signaling, to avoid potentially excessive buffer setup. For sender-model signaling, the initiating host should therefore disregard any between-parameters reported by shadow Resv messages and simply use the since-parameter of the last shadow Resv message (see section A.4.3). For hop-model signaling, the last QM to be contacted for setup of the shadow reservations should place its local since-parameter into its shadow Resv message, and any QM receiving a shadow Resv message should simply copy that value into its own shadow Resv message, regardless of the presence and value of a local between-parameter (see section A.4.4).

The features of the invention as disclosed in the above description, in the claims and in the drawings may be of importance for the implementation of the various embodiments of the invention both individually and in any desired combination.

References
[KOM] "Design and Implementation of RSVP based on Object-Relationships"; Karsten, M.; Technical Report TR-KOM-2000-01; University of Darmstadt; May 2000
[RAPI] "Resource Reservation Setup Protocol API (RAPI)"; The Open Group; December 1998
[RFC 1633] "Integrated Services in the Internet Architecture: an Overview"; IETF; June 1994
[RFC 2205] "Resource ReSerVation Protocol—Version 1 Functional Specification"; IETF; September 1997
[RFC 2210] "The Use of RSVP with IETF Integrated Services"; IETF; September 1997
[RFC 2211] "Specification of the Controlled-Load Network Element Service"; IETF; September 1997
[RFC 2212] "Specification of Guaranteed Quality of Service"; IETF; September 1997
[RFC 2215] "General Characterization Parameters for Integrated Services Network Elements"; IETF; September 1997
[RFC 2474] "Definition of the Differentiated Services Field (DS Field) in the IPv4 and IPv6 Headers"; IETF; December 1998
[RFC 2475] "An Architecture for Differentiated Services"; IETF; December 1998
[RFC 2638] "A Two-bit Differentiated Services Architecture for the Internet"; IETF; July 1999
[RFC 2814] "SBM (Subnet Bandwidth Manager): A Protocol for RSVP-based Admission Control over IEEE 802-style networks"; IETF; May 2000
[RFC 2996] "Format of the RSVP DCLASS Object"; IETF; November 2000
[RFC 2998] "A Framework for Integrated Services Operation over DiffServ Networks"; IETF; November 2000
[RFC 3175] "Aggregation of RSVP for IPv4 and IPv6 Reservations"; IETF; September 2001
[RFC 3260] "New Terminology and Clarifications for DiffServ"; IETF; April 2002
[RFC 3692] "Assigning Experimental and Testing Numbers Considered Useful"; IETF; January 2004

What is claimed is:

1. A method for managing data transmission according to a Quality of Service (QoS) in a network assembly by a QoS architecture implemented in the network assembly, wherein the network assembly is provided with a plurality of host devices organized in a domain structure, each domain of the domain structure comprising a QoS managing device assigned to the domain, and wherein, being managed by the QoS architecture using for information exchange a signal protocol, the method comprising:
for a proposed data transmission over the network assembly to a receiver host device, providing a resource request information with resource reservation parameters from a requesting host device to a receiving QoS managing device,
in response to the resource request information, providing a response information from the receiving QoS managing device to the requesting host device, wherein the response information comprises one of a resource reservation information indicating a resource reservation and a failure reservation information indicating a failure to reserve the requested resource,
if the resource reservation is made, maintaining the resource reservation by a maintaining mechanism implemented by the QoS architecture, and
terminating the resource reservation after a termination is initiated by one of a termination information received by the receiving QoS managing device from the maintaining mechanism, a termination request provided by the requesting host device to the receiving QoS managing device, and a termination request provided by the receiving QoS managing device by itself, providing additional reservation parameters by the receiver host device, and adapting the reservation parameters after reception of the additional reservation parameters by one of the requesting host device and the receiving QoS managing device.

2. Method according to claim 1, the method further comprising providing the maintaining mechanism according to one of the following procedures: soft state protocol procedure and hard state protocol procedure.

3. Method according to claim 1, the method further comprising initiating the resource request by one of a software application running on the requesting device, an embedded software, and a hardware device.

4. Method according to claim 1, the method further comprising reserving a plurality of sub resources in the network assembly by the resource reservation.

5. Method according to claim 4, the method further comprising assigning the plurality of sub resources to the QoS managing devices along a path of the proposed data transmission in the network assembly.

6. Method according to claim 1, wherein the proposed data transmission comprises a proposed data transfer over a plurality of domains of the domain structure.

7. Method according to claim 6, the method further comprising sending the resource request information according to a sender model, thereby providing the resource request information from the requesting host device to a plurality of QoS managing devices assigned to the plurality of domains, with each of the plurality of QoS managing devices being the receiving QoS managing device for the resource request information intended for the resource reservation within the domain the respective QoS managing device is assigned to.

8. Method according to claim 6, the method further comprising sending the resource request information according to a hop model, thereby providing the resource request information from the requesting host device to a first QoS managing device which in turn provides the resource request information to the QoS managing device assigned to the domain comprising the receiving host device or via remaining QoS managing devices assigned to the plurality of domains along the path of the proposed data transmission in the network assembly.

9. Method according to claim 6, the method further comprising sending the resource request information according to a logical end-to-end model, thereby providing the resource request information from the requesting host device to a first QoS managing device which in turn provides the resource request information directly to the receiving host device or indirectly via remaining QoS managing devices assigned to the plurality of domains along the path of the proposed data transmission in the network assembly.

10. Method according to claim 1, the method further comprising providing further reservation parameters by the receiving QoS managing device receiving the resource request information.

11. Method according to claim 10, the method further comprising adapting the reservation parameters after reception of the further reservation parameters by the requesting host device.

12. Method according to claim 10, the method further comprising adapting the reservation parameters after reception of the further reservation parameters by a QoS managing device different from the QoS managing device providing the further reservation parameters.

13. Method according to claim 1, wherein the QoS architecture is configured to support "Integrated Services in the Internet Architecture," according to one or more of the IETF (Internet Engineering Task Force) publications Request for Comments: RFC 1633, RFC 2210, RFC 2211, RFC 2212, and RFC 2215.

14. A computer network system, comprising a plurality of host devices organized in a domain structure, and a Quality of Service (QoS) architecture, each domain of the domain structure comprising a QoS managing device assigned to the domain, wherein the QoS architecture is configured to perform a method for data transmission according to claim 1.

15. Method according to claim 1, the method further comprising using an extended "Resource Reservation Protocol," according to IETF (Internet Engineering Task Force) publication Request for Comment, RFC 2205, as the signal protocol for the information exchange by the QoS architecture.

* * * * *